US012387895B2

(12) United States Patent
Yoo et al.

(10) Patent No.: US 12,387,895 B2
(45) Date of Patent: Aug. 12, 2025

(54) ARC PATH FORMATION UNIT AND DIRECT CURRENT RELAY INCLUDING SAME

(71) Applicant: LS ELECTRIC CO., LTD., Anyang-si (KR)

(72) Inventors: Jung Woo Yoo, Anyang-si (KR); Han Mi Ru Kim, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 244 days.

(21) Appl. No.: 18/034,632

(22) PCT Filed: Oct. 27, 2021

(86) PCT No.: PCT/KR2021/015221
§ 371 (c)(1),
(2) Date: Apr. 28, 2023

(87) PCT Pub. No.: WO2022/092808
PCT Pub. Date: May 5, 2022

(65) Prior Publication Data

US 2023/0411096 A1 Dec. 21, 2023

(30) Foreign Application Priority Data

Oct. 28, 2020 (KR) ........................ 10-2020-0141512

(51) Int. Cl.
*H01H 50/38* (2006.01)
*H01H 50/54* (2006.01)

(52) U.S. Cl.
CPC ............ *H01H 50/38* (2013.01); *H01H 50/54* (2013.01)

(58) Field of Classification Search
None
See application file for complete search history.

(56) References Cited

U.S. PATENT DOCUMENTS

2011/0240603 A1* 10/2011 Hoffmann .............. H01H 9/443 218/26
2012/0175344 A1* 7/2012 Tachikawa ............ H01H 9/443 218/26
(Continued)

FOREIGN PATENT DOCUMENTS

CN 210467722 U 5/2020
EP 4174894 A1 5/2023
(Continued)

OTHER PUBLICATIONS

International Search Report for related International Application No. PCT/KR2021/015221; action dated May 5, 2022; (5 pages).
(Continued)

*Primary Examiner* — Bernard Rojas
(74) *Attorney, Agent, or Firm* — K&L Gates LLP

(57) ABSTRACT

Disclosed are an arc path forming part and a direct current relay including the same. An arc path forming part according to an embodiment of the present disclosure comprises a plurality of magnet parts. Each magnet part is located on one side and the other side of the arc path forming part, respectively, to form a magnetic field inside an arc chamber. The arc generated inside the arc chamber is extended in a direction away from the center of the arc chamber by receiving electromagnetic force from the magnetic field. Thus, damage to each component located at the center can be prevented.

19 Claims, 22 Drawing Sheets

(56) References Cited

U.S. PATENT DOCUMENTS

| | | | | |
|---|---|---|---|---|
| 2012/0175345 | A1* | 7/2012 | Tachikawa | H01H 9/443<br>218/26 |
| 2012/0181860 | A1* | 7/2012 | Hsu | H01H 9/443<br>218/24 |
| 2015/0042424 | A1 | 2/2015 | Maruyama et al. | |

FOREIGN PATENT DOCUMENTS

| | | | |
|---|---|---|---|
| JP | 2016072020 | A | 5/2016 |
| JP | 2019036431 | A | 3/2019 |
| KR | 20160000079 | U | 1/2016 |
| KR | 102009875 | B1 | 8/2019 |
| KR | 20200103099 | A | 9/2020 |
| WO | 2011104902 | A1 | 9/2011 |
| WO | 2020094135 | A1 | 5/2020 |

OTHER PUBLICATIONS

Written Opinion for related International Application No. PCT/KR2021/015221; action dated May 5, 2022; (10 pages).
Extended European Search Report for related European Application No. 21886802.4; action dated Sep. 16, 2024; (7 pages).

* cited by examiner (a)

(b)

(a)

(b)

(a)

(b)

(a)

(b)

(b)

(a)

(b)

(a)

(b)

(a)

(b)

(a)

(b)

ARC PATH FORMATION UNIT AND DIRECT CURRENT RELAY INCLUDING SAME

CROSS-REFERENCE TO RELATED APPLICATION

The present application is a National Stage of International Application No. PCT/KR2021/015221 filed on Oct. 27, 2021, which claims priority to and the benefit of Korean Utility Model Application No. 10-2020-0141512, filed Oct. 28, 2020, the disclosures of which are incorporated herein by reference in its entirety.

FIELD

The present disclosure relates to an arc path forming part and a direct current relay including the same and, more particularly, to an arc path forming part having a structure capable of effectively directing a generated arc to the outside, and a direct current relay including the same.

BACKGROUND

A direct current relay is a device that transmits a mechanical drive or current signal using the principle of an electromagnet. The direct current relay is also called an electromagnetic switch, and is generally classified as an electrical circuit switching device.

The direct current relay includes a fixed contact and a movable contact. The fixed contact is electrically connected to an external power source and load. The fixed contact and the movable contact may be in contact with each other or spaced apart from each other.

By contact and separation between the fixed contact and the movable contact, applying electric current through the direct current relay is allowed or blocked. The movement is achieved by a driving unit that applies a driving force to the movable contact.

When the fixed contact and the movable contact are spaced apart, an arc is generated between the fixed contact and the movable contact. An arc is a flow of high-voltage, high-temperature current. Therefore, the generated arc must be quickly discharged from the direct current relay through a predetermined path.

The discharge path of the arc is formed by a magnet provided in the direct current relay. The magnet forms a magnetic field inside a space where the fixed contact and the movable contact is in contact with each other. The discharge path of the arc may be formed by the electromagnetic force generated by the formed magnetic field and current flow.

Referring to FIG. 1, a space in which a fixed contact 1100 and a movable contact 1200 provided in a direct current relay 1000 according to the related art come into contact is shown. As described above, a permanent magnet 1300 is provided in the space.

The permanent magnet 1300 includes a first permanent magnet 1310 positioned at an upper side and a second permanent magnet 1320 positioned at a lower side.

A plurality of first permanent magnets 1310 are provided, and the polarity of each surface thereof facing the second permanent magnet 1320 is magnetized to a different polarity. The lower side of the first permanent magnet 1310 positioned on the left side of FIG. 1 is magnetized to N pole, and the lower side of the second permanent magnet 1320 positioned on the right side of FIG. 1 is magnetized to S pole.

In addition, a plurality of second permanent magnets 1320 are also provided, and the polarity of each surface thereof facing the first permanent magnet 1310 is magnetized to a different polarity. The upper side of the second permanent magnet 1320 positioned on the left side of FIG. 1 is magnetized to S pole, and the upper side of the second permanent magnet 1320 positioned on the right side of FIG. 1 is magnetized to N pole.

FIG. 1(*a*) shows a state in which electric current flows in through the fixed contact 1100 on the left side and flows out through the fixed contact 1100 on the right side. According to Flemings left-hand rule, the electromagnetic force is formed like a hatched arrow.

Specifically, in the case of the fixed contact 1100 located on the left side, the electromagnetic force is formed toward the outside. Accordingly, the arc generated at the corresponding location can be discharged to the outside.

However, in the case of the fixed contact 1100 located on the right side, the electromagnetic force is formed toward the inside, that is, toward the central portion of the movable contact 1200. Accordingly, the arc generated at the corresponding location cannot be immediately discharged to the outside.

In addition, FIG. 1(*h*) shows a state in which electric current flows in through the fixed contact 1100 on the right side and flows out through the fixed contact 1100 on the left side. According to Flemings left-hand rule, the electromagnetic force is formed like a hatched arrow.

Specifically, in the case of the fixed contact 1100 located on the right side, the electromagnetic force is formed toward the outside. Accordingly, the arc generated at the corresponding location can be discharged to the outside.

However, in the case of the fixed contact 1100 located on the left side, the electromagnetic force is formed toward the inside, that is, toward the central portion of the movable contact 1200. Accordingly, the arc generated at the corresponding location cannot be immediately discharged to the outside.

Several members for driving the movable contact 1200 in the vertical direction are provided in the central portion of the direct current relay 1000, that is, in the space between each fixed contact 1100. For example, a shaft, a spring member inserted through the shaft, and the like are provided at the above position.

Therefore, if the arc generated as shown in FIG. 1 is moved toward the central portion, and when the arc moved to the central portion is not immediately moved to the outside, there is a concern that several members provided at the position may be damaged by the energy of the arc.

In addition, as shown in FIG. 1, the direction of the electromagnetic force formed inside the direct current relay 1000 according to the related art depends on the direction of the current applied to the fixed contact 1200. That is, the position of the electromagnetic force formed in the inward direction among the electromagnetic forces generated at each fixed contact point 1100 is different according to the direction of the current.

That is, the user must consider the direction of the current whenever using the direct current relay. This may cause inconvenience in use of the direct current relay. In addition, regardless of the user's intention, a situation in which the direction of the current applied to the direct current relay is changed due to inexperienced operation cannot be excluded.

In this case, members provided in the central portion of the direct current relay may be damaged by the generated arc. Accordingly, the durability period of the direct current relay may be reduced, and safety accidents may occur.

Korean Patent Registration No. 10-1696952 discloses a direct current relay. Specifically, it discloses a direct current relay with a structure capable of preventing movement of a movable contact by using a plurality of permanent magnets.

However, although the direct current relay of the above structure can prevent movement of the movable contact by using a plurality of permanent magnets, there is a limitation in that there is no consideration for a method for controlling the direction of an arc discharge path.

Korean Patent Registration No. 10-1216824 discloses a direct current relay. Specifically, it discloses a direct current relay with a structure capable of preventing any separation between a movable contact and a fixed contact by using a damping magnet.

However, the direct current relay having the above structure only proposes a method for maintaining the contact state between the movable contact and the fixed contact. That is, there is a limitation in that a method for forming a discharge path of an arc generated when the movable contact and the fixed contact are separated is not proposed.

(Patent Document 1) Korean Patent Registration No. 10-1696952 (2017, Jan. 16.)

(Patent Document 2) Korean Patent Registration Na 10-1216824 (2012, Dec. 28.)

SUMMARY

The present disclosure is directed to providing an arc path forming part having a structure capable of solving the above problems, and a direct current relay including the same.

First, it is directed to providing an arc path forming part having a structure capable of quickly extinguishing and discharging an arc generated as the energized electric current is cut off, and a direct current relay including the same.

In addition, it is directed to providing an arc path forming part having a structure capable of reinforcing the magnitude of force for directing a generated arc, and a direct current relay including the same.

In addition, it is directed to providing an arc path forming part having a structure capable of preventing damage to components for energizing electric current due to a generated arc, and a direct current relay including the same.

In addition, it is directed to providing an arc path forming part having a structure in which arcs generated at a plurality of locations can proceed without meeting each other, and a direct current relay including the same.

In addition, it is directed to providing an arc path forming part having a structure capable of achieving the above objects without excessive design change, and a direct current relay including the same.

To achieve the above objects, the present disclosure provides an arc path forming part, comprising: a magnet frame comprising a space part for accommodating an arc chamber and a plurality of surfaces surrounding the space part; a first magnet part accommodated in the space part and comprising a magnet part disposed on at least one of the plurality of surfaces of the magnet frame, wherein the magnet part is positioned adjacent to one surface of the plurality of surfaces; and a second magnet part positioned adjacent to the other one surface of the plurality of surfaces facing the first magnet part with the space part interposed therebetween, wherein the first magnet part includes a plurality of magnet blocks disposed side by side in a direction in which the one surface extends, each inner surface thereof facing each other being magnetized to the same polarity, and wherein an inner surface of the second magnet part facing the first magnet part is magnetized to a polarity different from said polarity.

In addition, the first magnet part of the arc path forming part may include a first magnet block that extends in a direction in which the one surface of the magnet frame extends, and is positioned to be biased to one side in the extending direction; and a second magnet block that extends in the same direction as the direction in which the first magnet block extends, and is positioned to be biased to the other side of the extending direction.

In addition, the first magnet block and the second magnet block of the arc path forming part may be disposed spaced apart from each other.

In addition, the second magnet part of the arc path forming part may extend in a direction in which the other one surface of the magnet frame extends.

In addition, a magnetic intensity of the second magnet part of the arc path forming part may be greater than a magnetic intensity of any one of the plurality of magnet blocks of the first magnet part.

In addition, the second magnet part of the arc path forming part may be an Nd magnet (Neodymium Magnet) or an NIB magnet (Neodymium-Iron-Boron Magnet).

In addition, a fixed contact and a movable contact accommodated in the arc chamber may be positioned between the first magnet part and the second magnet part of the arc path forming part.

In addition, the present disclosure provides an arc path forming part, comprising: a magnet frame comprising a space part for accommodating a fixed contact; a first magnet part comprising a magnet part accommodated in the space part, the magnet part being biased to one side of the space part; and a second magnet part positioned biased to the other side of the space part to face the first magnet part with the space part interposed therebetween, wherein the first magnet part includes a plurality of magnet blocks disposed side by side toward another other side and yet another other side opposite thereto, each inner surface facing each other and an inner surface facing the second magnet part are magnetized to the same polarity, and wherein an outer surface of the second magnet part opposite to the space part is magnetized to the same polarity as said polarity.

In addition, the first magnet part of the arc path forming part may include a first magnet block positioned biased to one of the another other side and the yet another other side and extending along the disposition direction; a second magnet block positioned biased to the other one of the another other side and the yet another other side and extending along the disposition direction; and a third magnet block positioned between the first magnet block and the second magnet block and extending along the disposition direction.

In addition, an inner surface of the first magnet block facing the third magnet block and an inner surface of the second magnet block facing the third magnet block of the arc path forming part may be magnetized to the same polarity, and among surfaces of the third magnet block, an inner surface facing the second magnet part may be magnetized to the same polarity as each of the inner surfaces of the first magnet block and the second magnet block.

In addition, the third magnet block of the arc path forming part may be in contact with the first magnet block and the second magnet block, respectively, so that the first magnet part is formed in a Halbach array.

In addition, a magnetic intensity of the second magnet part of the arc path forming part may be greater than a magnetic intensity of any one of the plurality of magnet blocks of the first magnet part.

In addition, the second magnet part of the arc path forming part may be an Nd magnet (Neodymium Magnet) or an NIB magnet (Neodymium-Iron-Boron Magnet).

The second magnet part of the arc path forming part may include a first magnet unit positioned biased to one of the another other side and the yet another other side and extending along the disposition direction; and a second magnet unit positioned biased to the other one of the another other side and the yet another other side and extending along the disposition direction.

In addition, an inner surface of surfaces of the first magnet unit facing the space part and an inner surface of surfaces of the second magnet unit facing the space part of the arc path forming part may be magnetized to the same polarity.

Each of the inner surfaces of the plurality of magnet blocks of the first magnet part of the arc path forming part may be magnetized to a polarity different from that of each of the inner surfaces of the first magnet unit and the second magnet unit of the second magnet part.

In addition, the present disclosure provides a direct current relay, comprising: a fixed contact electrically connected to an external power source and load; a movable contact coming into contact with and spaced apart from the fixed contact; an arc chamber for accommodating the fixed contact and the movable contact; and an arc path forming part that surrounds the arc chamber and directs an arc generated inside the arc chamber, wherein the movable contact has a length in one direction longer than a length in the other direction, wherein the arc path forming part includes: a first magnet part disposed spaced apart from the movable contact along the one direction on one side of the movable contact; and a second magnet part disposed on the other side of the movable contact and spaced apart from the movable contact along the one direction to face the first magnet part with the movable contact interposed therebetween, wherein the first magnet part comprises a plurality of magnet blocks disposed side by side along the other direction and having inner surfaces facing each other magnetized to the same polarity, and wherein an inner surface of the second magnet part facing the first magnet part is magnetized to a polarity different from said polarity.

In addition, the present disclosure provides a direct current relay, comprising: a fixed contact electrically connected to an external power source and load; a movable contact coming into contact with and spaced apart from the fixed contact; and an arc path forming part in which a space part for accommodating the fixed contact and the movable contact is formed therein, wherein the arc path forming part includes: a pair of surfaces partially surrounding the space part and disposed to face each other; a first magnet part disposed adjacent to one of the pair of surfaces in the space part; and a second magnet part disposed adjacent to the other one of the pair of surfaces in the space part, wherein the first magnet part includes a plurality of magnet blocks disposed side by side along a direction in which one of the surfaces extends, each inner surface facing each other and an inner surface facing the second magnet part being magnetized to the same polarity, and wherein an inner surface of the second magnet part facing the first magnet parts magnetized to a polarity different from said polarity.

In addition, the present disclosure provides a direct current relay, comprising: a fixed contact electrically connected to an external power source and load; a movable contact coming into contact with and spaced apart from the fixed contact; and an arc path forming part in which a space part for accommodating the fixed contact and the movable contact is formed therein, wherein the arc path forming part includes: a pair of surfaces surrounding a portion of the space part and disposed to face each other; another pair of surfaces surrounding the remaining portion of the space part, being continuous with the pair of surfaces, and disposed to face each other; a first magnet part disposed adjacent to one of the pair of surfaces in the space part; and a second magnet part disposed adjacent to the other one of the pair of surfaces in the space part, wherein the first magnet part comprises a plurality of magnet blocks disposed side by side along a direction in which one of the surfaces extends, each inner surface facing each other and an inner surface facing the second magnet part being magnetized to the same polarity, and wherein the second magnet part comprises a plurality of magnet units disposed side by side along a direction in which the other surface extends, each inner surface facing each other being magnetized to a polarity different from said polarity.

According to an embodiment of the present disclosure, the following effects can be achieved.

First, the arc path forming part includes a plurality of magnet parts. Each magnet part is disposed to surround the space part inside the arc path forming part at different positions. Each magnet part forms a magnetic field inside the arc path forming part, respectively. The formed magnetic field forms an electromagnetic force together with a electric current energized in the fixed contact and the movable contact accommodated in the arc path forming part.

In this case, the generated arc is formed in a direction away from each fixed contact. An arc generated when the fixed contact and the movable contact are separated may be directed by the electromagnetic force.

Accordingly, the generated arc can be quickly extinguished and discharged to the outside of the arc path forming part and the direct current relay.

Also, in various embodiments, each magnet part may include a plurality of magnet blocks or a plurality of magnet units. In an embodiment in which a plurality of magnet blocks or a plurality of magnet units are provided, the intensity of the magnetic field formed by each magnet part may be enhanced.

Likewise, as the plurality of magnet blocks or the plurality of magnet units are provided, the intensity of the magnetic field formed between the plurality of magnet parts may also be enhanced. That is, the intensity of the magnetic field formed inside the space part can be enhanced by the configuration of each magnet part.

Accordingly, the intensity of the electromagnetic force that depends on the intensity of the magnetic field can also be enhanced. As a result, the intensity of the electromagnetic force directing the generated arc is enhanced, so that the generated arc can be effectively extinguished and discharged.

In addition, the direction of the electromagnetic force formed by the magnetic field formed by each magnet part and the electric current energized in the fixed contact and the movable contact is formed in a direction away from the central portion.

In particular, in various embodiments, the direction of the electromagnetic force may be formed toward the corner of the arc chamber so as to be opposite to the central portion.

Furthermore, since the intensity of the magnetic field and electromagnetic force is enhanced by each magnet part as described above, the generated arc can be extinguished and moved quickly in a direction away from the central portion.

Therefore, damage to various components provided adjacent to the central portion for the operation of the direct current relay can be prevented.

Also, in various embodiments, a plurality of fixed contacts can be provided. Each magnet part provided in the arc path forming part forms magnetic fields in different directions in the vicinity of each fixed contact. Therefore, paths of arcs generated in the vicinity of each fixed contact proceed in different directions.

Therefore, the arcs generated in the vicinity of each fixed contact do not meet each other. Accordingly, malfunctions or safety accidents or the like that may occur due to collisions of arcs generated at different locations can be prevented.

In addition, in order to achieve the above objects and effects, the arc path forming part includes each magnet part provided in the space part. In various embodiments, each magnet part can be located inside each surface of the magnet frame surrounding the space part.

That is, a separate design change for disposing each magnet part outside the space part is not required.

Therefore, the arc path forming part according to various embodiments of the present disclosure can be provided in the direct current relay without excessive design change. Accordingly, time and cost for applying the arc path forming part according to various embodiments of the present disclosure can be reduced.

DETAILED DESCRIPTION

Figure 1:
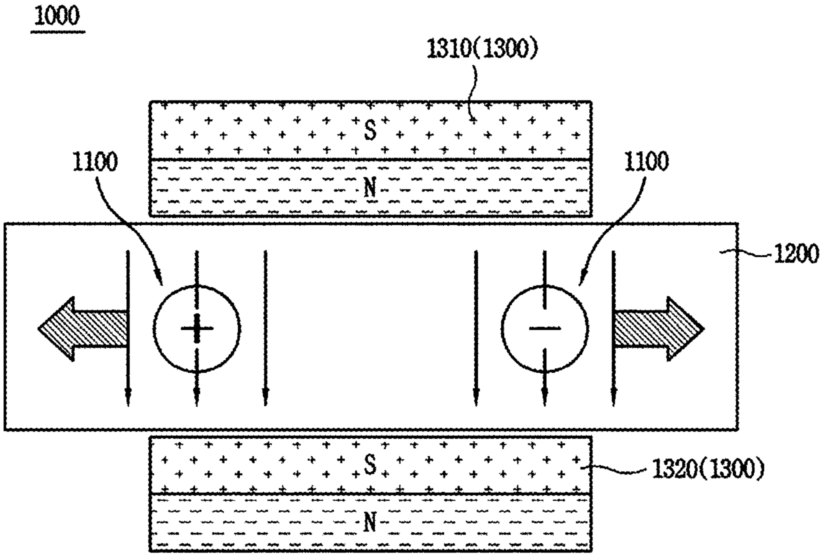
FIG. 1 (PRIOR ART)
FIG. 1 is a conceptual diagram illustrating a direct current relay according to the related art.
Figure 1:
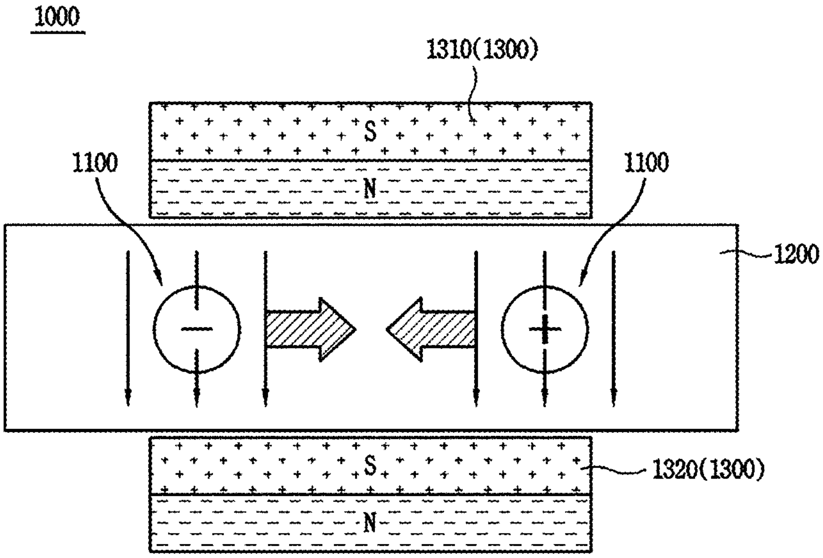
FIG. 1 (PRIOR ART)

Hereinafter, an arc path forming part 100, 200 or 300 and a direct current relay 1 including the same according to the embodiment of the present disclosure will be described in detail with reference to the accompanying drawings.

In the following description, in order to clarify the features of the present disclosure, descriptions of some components may be omitted.

1. Term Definition

When an element is referred to as being "connected" or "linked" to other element, it will be understood that it can be directly connected or linked to the other element but intervening elements may also be present.

On the other hand, when an element is referred to as being "directly connected" or "directly linked" to other element, it will be understood that there are no intervening elements present.

As used herein, expressions in the singular include plural expressions unless the context clearly indicates otherwise.

The term "magnetize" used in the following description means a phenomenon in Which an object becomes magnetic in a magnetic field.

The term "polarity" used in the following description refers to different properties of an anode and a cathode of an electrode. In an embodiment, the polarity may be divided into N pole or S pole.

The term "electric current" used in the following description means a state in which two or more members are electrically connected.

The term "arc path (A.P)" used in the following description means a path along which a generated arc is moved or is extinguished and moved.

"⊙" shown in the following figures means a flow in a direction in which the current flows from the movable contact 43 toward the fixed contact 22 (i.e., upward direction), that is, in a direction coming out of the ground.

"⊗" shown in the following figures means a flow in a direction in which the current flows from the fixed contact 22 toward the movable contact 43 downward direction), that is, a direction penetrating the ground.

The term "Halbach array" used in the following description refers to an aggregate composed of a column or a row by arranging a plurality of magnetic materials side by side.

A plurality of magnetic materials constituting the Halbach array may be arranged according to a predetermined rule. A plurality of magnetic materials may form a magnetic field by themselves or between each other.

The Halbach array includes two relatively long surfaces and two relatively short surfaces. The magnetic field formed by the magnetic material constituting the Halbach array may be formed with a stronger intensity on the outer side of any one of the two long surfaces.

In the following description, it is described on the premise that the intensity of the magnetic field in the direction toward the space parts 115, 215, and 315 among the magnetic fields formed by the Halbach array is stronger.

The term "magnet part" used in the following description refers to any type of object that is formed of a magnetic material and can form a magnetic field. In an embodiment, the magnet part may be provided with a permanent magnet or an electromagnet. It will be understood that the magnet part is a magnetic material different from the magnetic material forming the Halbach array, that is, provided separately from the Halbach array.

The magnet part may form a magnetic field by itself or together with other magnetic materials.

The magnet part may extend in one direction. The magnet part may be magnetized to different polarities of opposite ends in the one direction (i.e., have different polarities in the longitudinal direction). In addition, the magnet part may be magnetized to different polarities of opposite surfaces in the other direction different from the one direction (i.e., have different polarities in the width direction).

The magnetic field formed by the arc path forming part 100, 200, or 300 according to an embodiment of the present disclosure is shown as a dotted line in each drawing.

Figure 2:
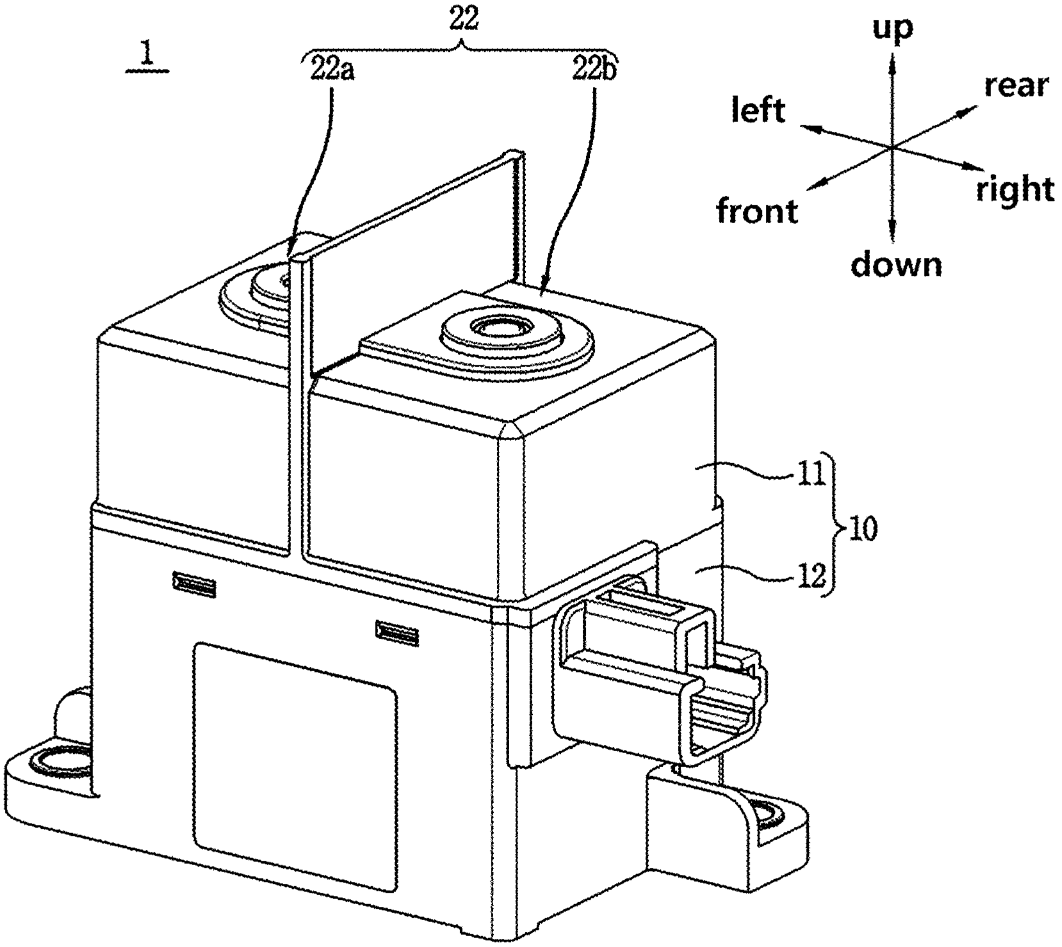
FIG. 2 is a perspective view illustrating a direct current relay according to an exemplary embodiment of the present disclosure.

The terms "left side", "right side", "upper side", "lower side", "front side", and "rear side" used in the following description will be understood with reference to the coordinate system shown in FIG. 2.

Figure 3:
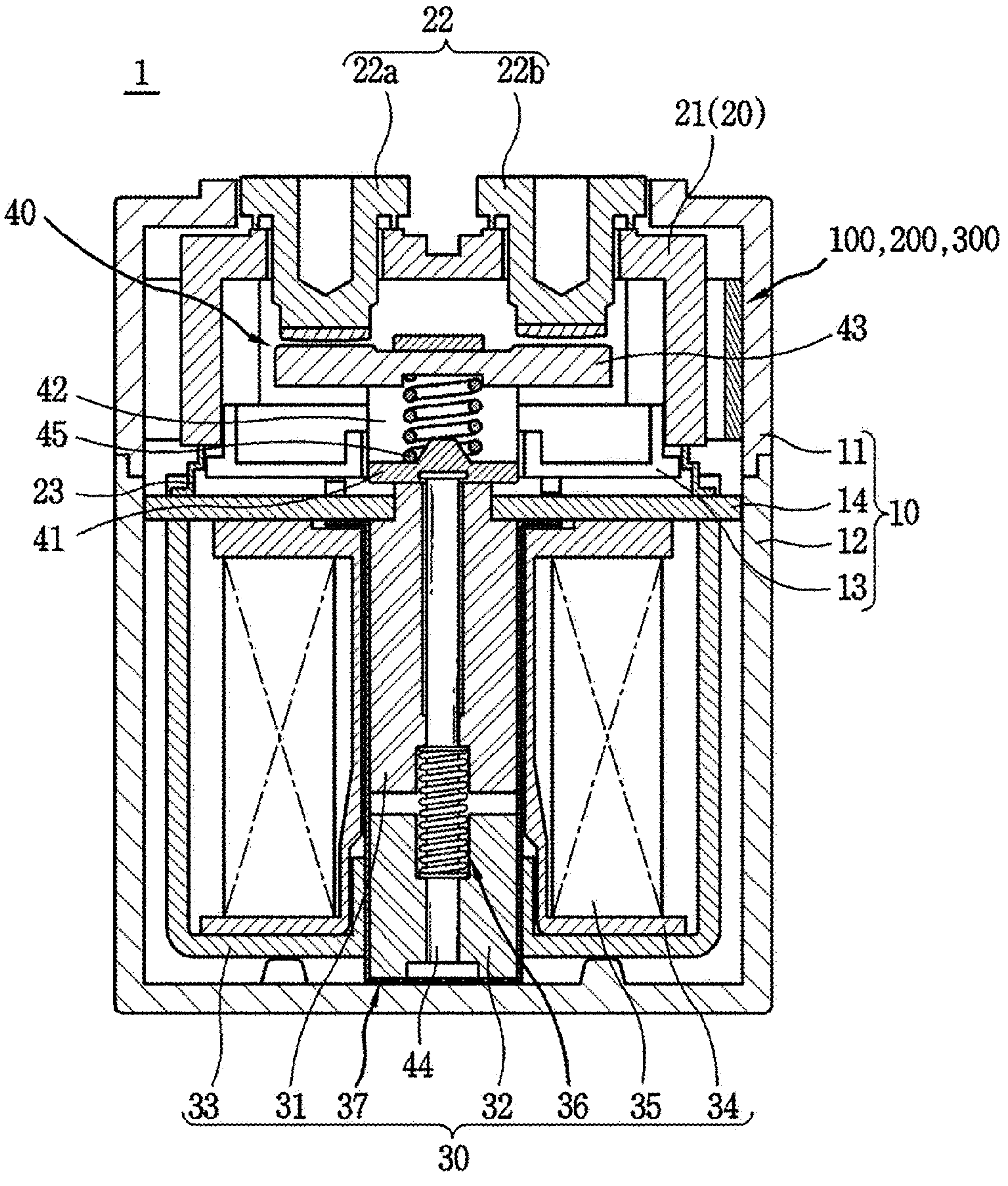
FIG. 3 is a cross-sectional view illustrating the configuration of the direct current relay of FIG. 2.
Figure 4:
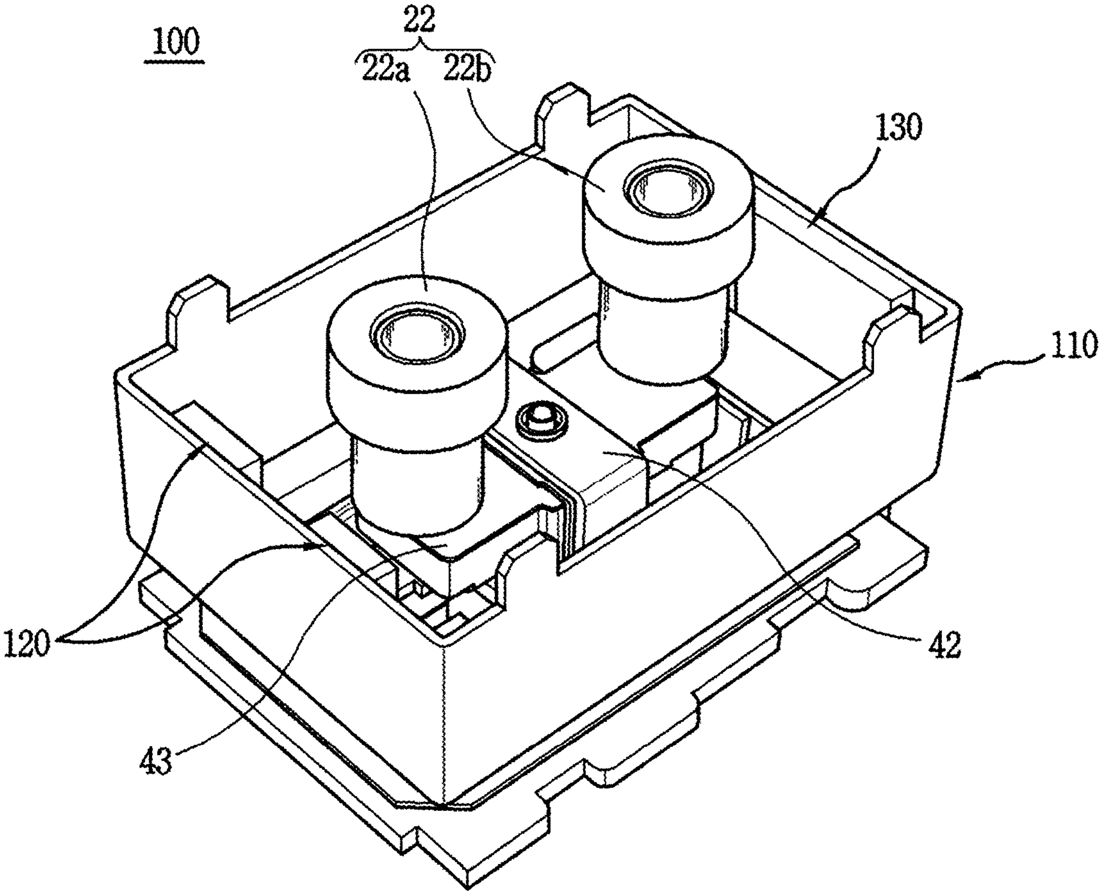
FIG. 4 is an open perspective view illustrating an arc path forming part provided in the direct current relay of FIG. 2.

2. Description of the Configuration of the Direct Current Relay 1 According to the Embodiment of the Present Disclosure Referring to FIGS. 2 to 4, the direct current relay 1 according to the embodiment of the present disclosure includes a frame part 10, a switch part 20, a core part 30, and a movable contact part 40.

In addition, referring to FIGS. 5 to 22, the direct current relay 1 according to the embodiment of the present disclosure includes an arc path forming part 100, 200 or 300.

The arc path forming part 100, 200, or 300 may form a discharge path of the generated arc.

Hereinafter, each configuration of the direct current relay 1 according to the embodiment of the present disclosure will be described with reference to the accompanying drawings, and the arc path forming part 100, 200 or 300 will be separately described.

The arc path forming parts 100, 200, and 300 according to various embodiments described below will be described on the premise that they are provided in a direct current relay 1.

However, it will be understood that the arc path forming parts 100, 200, and 300 may be applied to a type of device, such as electromagnetic contactor and electromagnetic switch, capable of energizing electric current or blocking electric current with the outside by contact and separation between the fixed contact and the movable contact.

(1) Description of the Frame Part 10

The frame part 10 forms the outer side of the direct current relay 1. A predetermined space is formed inside the frame part 10. Various devices performing a function of applying or blocking electric current transferred from the outside by the direct current relay 1 may be accommodated in the space.

That is, the frame part 10 functions as a kind of housing.

The frame part 10 may be formed of an insulating material such as a synthetic resin. It is to prevent the inside and the outside of the frame part 10 from being arbitrarily electrically currented.

The frame part 10 includes an upper frame 11, a lower frame 12, an insulating plate 13, and a support plate 14.

The upper frame 11 forms an upper side of the frame part 10. A predetermined space is formed inside the upper frame 11.

The switch part 20 and the movable contact part 40 may be accommodated in the inner space of the upper frame 11. In addition, the arc path forming part 100, 200 or 300 may be accommodated in the inner space of the upper frame 11.

The upper frame 11 may be coupled to the lower frame 12. The insulating plate 13 and the support plate 14 may be provided in a space between the upper frame 11 and the lower frame 12.

A fixed contact 22 of the switch part 20 is positioned on one side of the upper frame 11, that is, on the upper side in the illustrated embodiment. A portion of the fixed contact 22 may be exposed on the upper side of the upper frame 11, and may be electrically connected to an external power source or load.

To this end, a through hole through which the fixed contact 22 is through-coupled may be formed on the upper side of the upper frame 11.

The lower frame 12 forms a lower side of the frame part 10. A predetermined space is formed inside the lower frame 12. The core part 30 may be accommodated in the inner space of the lower frame 12.

The lower frame 12 may be coupled to the upper frame 11. The insulating plate 13 and the support plate 14 may be provided in a space between the lower frame 12 and the upper frame 11.

The insulating plate 13 and the support plate 14 electrically and physically separate the inner space of the upper frame 11 and the inner space of the lower frame 12.

The insulating plate 13 is positioned between the upper frame 11 and the lower frame 12. The insulating plate 13 electrically separates the upper frame 11 and the lower frame 12. To this end, the insulating plate 13 may be formed of an insulating material such as a synthetic resin.

By the insulating plate 13, any electric current between the switch part 20, the movable contact part 40, and the arc path forming part 100, 200 or 300 accommodated in the upper frame 11 and the core part 30 accommodated in the lower frame 12 may be prevented.

A through hole (not shown) is formed at the center of the insulating plate 13. A shaft 44 of the movable contact part 40 is through-coupled to the through hole (not shown) so as to be movable in the vertical direction.

The support plate 14 is positioned below the insulating plate 13. The insulating plate 13 may be supported by the support plate 14.

The support plate 14 is positioned between the upper frame 11 and the lower frame 12.

The support plate 14 physically separates the upper frame 11 and the lower frame 12. In addition, the support plate 14 supports the insulating plate 13.

The support plate 14 may be formed of a magnetic material. Therefore, the support plate 14 may form a magnetic circuit together with a yoke 33 of the core part 30. A driving force for moving the movable core 32 of the core part 30 toward the stationary core 31 may be formed by the magnetic circuit.

A through hole (not shown) is formed at the center of the support plate 14. The shaft 44 is through-coupled to the through hole (not shown) so as to be movable in the vertical direction.

Accordingly, when the movable core 32 is moved in a direction toward the stationary core 31 or away from the stationary core 31, the shaft 44 and the movable contact 43 connected to the shaft 44 may also be moved together in the same direction.

(2) Description of the Switch Part 20

The switch part 20 allows or blocks energizing electric current according to the operation of the core part 30. Specifically, the switch part 20 may allow or block energizing electric current by contracting or separating the fixed contact 22 and the movable contact 43.

The switch part 20 is accommodated in the inner space of the upper frame 11. The switch part 20 may be electrically and physically separated from the core part 30 by the insulating plate 13 and the support plate 14.

The switch part 20 includes an arc chamber 21, a fixed contact 22, and a sealing member 23.

In addition, an arc path forming part 100, 200, or 300 may be provided outside the arc chamber 21. The arc path forming part 100, 200, or 300 may form a magnetic field for forming an arc path A.P for an arc generated inside the arc chamber 21. This will be described later in detail.

The arc chamber 21 extinguishes an arc generated when the fixed contact 22 and the movable contact 43 are separated from each other in an inner space. Accordingly, the arc chamber 21 may be referred to as an "arc extinguishing part".

The arc chamber 21 hermetically accommodates the fixed contact 22 and the movable contact 43. That is, the fixed contact 22 and the movable contact 43 are accommodated inside the arc chamber Therefore, an arc generated when the fixed contact 22 and the movable contact 43 are separated from each other does not arbitrarily leak to the outside.

A gas for extinguishing may be filled in the arc chamber 21. The gas for extinguishing allows the generated arc to be extinguished and discharged to the outside of the direct current relay 1 through a preset path. To this end, a communication hole (not shown) may be formed through a wall surrounding the inner space of the arc chamber 21.

The arc chamber 21 may be formed of an insulating material. In addition, the arc chamber 21 may be formed of a material having high pressure resistance and high heat resistance. This is due to the generated arc being the flow of high temperature and high pressure electrons. In an embodiment, the arc chamber 21 may be formed of a ceramic material.

A plurality of through holes may be formed on the upper side of the arc chamber 21. A fixed contact 22 is through-coupled to each of the through holes.

In the illustrated embodiment, two fixed contacts 22 are provided, including a first fixed contact 22*a* and a second fixed contact 22*b*. Accordingly, two through holes may also be formed on the upper side of the arc chamber 21.

When the fixed contact 22 is through-coupled to the through hole, the through hole is sealed. That is, the fixed contact 22 is hermetically coupled to the through hole. Accordingly, the generated arc is not discharged to the outside through the through hole.

The lower side of the arc chamber 21 may be open. The insulating plate 13 and the sealing member 23 are in contact with the lower side of the arc chamber 21. That is, the lower side of the arc chamber 21 is sealed by the insulating plate 13 and the sealing member 23.

Accordingly, the arc chamber 21 may be electrically and physically separated from the outer space of the upper frame 11.

The arc extinguished in the arc chamber 21 is discharged to the outside of the direct current relay 1 through a preset path. In an embodiment, the extinguished arc may be discharged to the outside of the arc chamber 21 through the communication hole (not shown).

The fixed contact 22 is in contact with or separated from the movable contact 43 to apply or block internal and external electric current energization of the direct current relay 1.

Specifically, when the fixed contact 22 is in contact with the movable contact 43, the inside and outside of the direct current relay 1 pray be energizing electric current. On the other hand, when the fixed contact 22 is separated from the movable contact 43, the electric current energization of the inside and outside of the direct current relay 1 may be blocked.

As can be seen from the name, the fixed contact 22 is not moved. That is, the fixed contact is fixedly coupled to the upper frame 11 and the arc chamber 21. Thus, the contact and separation of the fixed contact 22 and the movable contact 43 are achieved by the movement of the movable contact 43.

One end of the fixed contact 22, that is, the upper end in the illustrated embodiment, is exposed to the outside of the upper frame 11. A power source or a load is electrically connected to the one end.

A plurality of fixed contacts 22 may be provided. In the illustrated embodiment, two fixed contacts 22 are provided, including a first fixed contact 22*a* on the left side and a second fixed contact 22*b* on the right side.

The first fixed contact 22*a* is positioned to be biased to one side, that is, the left in the illustrated embodiment, from the center in the longitudinal direction of the movable contact 43. In addition, the second fixed contact 22*b* is positioned to be biased to the other side, that is, the right in the illustrated embodiment, from the center in the longitudinal direction of the movable contact 43.

A power source may be electrically connected to any one of the first fixed contact 22*a* and the second fixed contact 22*b*. In addition, a load may be electrically connected to the other one of the first fixed contact 22*a* and the second fixed contact 22*h*.

The direct current relay 1 according to an embodiment of the present disclosure may form an arc path A.P regardless of the direction of a power source or load connected to the fixed contact 22. This is achieved by the arc path forming part 100, 200, or 300, which will be described in detail later.

The other end of the fixed contact 22, that is, the lower end in the illustrated embodiment, extends toward the movable contact 43.

When the movable contact 43 is moved in a direction toward the fixed contact 22, that is, upward in the illustrated embodiment, the lower end comes into contact with the movable contact 43. Accordingly, the outside and the inside of the direct current relay 1 may be energizing electric current.

The lower end of the fixed contact 22 is located inside the arc chamber 21.

When the control power is cut off, the movable contact 43 is spaced apart from the fixed contact 22 by an elastic force of a return spring 36.

In this case, as the fixed contact 22 and the movable contact 43 are spaced apart from each other, an arc is generated between the fixed contact 22 and the movable contact 43. The generated arc may be extinguished by a gas for extinguishing inside the arc chamber 21 and may be discharged to the outside along a path formed by the arc path forming part 100, 200, or 300.

The sealing member 23 blocks any communication between the arc chamber 21 and a space inside the upper frame 11. The sealing member 23 seals the lower side of the arc chamber 21 together with the insulating plate 13 and the support plate 14.

Specifically, the upper side of the sealing member 23 is coupled to the lower side of the arc chamber 21. In addition, the radially inner side of the sealing member 23 is coupled to the outer circumference of the insulating plate 13, and the lower side of the sealing member 23 is coupled to the support plate 14.

Accordingly, the arc generated in the arc chamber 21 and the arc extinguished by the gas for extinguishing do not arbitrarily leak into the inner space of the upper frame 11.

In addition, the sealing member 23 may be configured to block any communication between the inner space of the cylinder 37 and the inner space of the frame part 10.

(3) Description of the Core Part 30

The core part 30 moves the movable contact part 40 upward according to the application of the control power. In addition, when the application of the control power is released, the core part 30 moves the movable contact part 40 downward again.

The core part 30 may be electrically connected to an external control power (not shown) to receive the control power.

The core part 30 is located below the switch part 20. In addition, the core part 30 is accommodated inside the lower frame 12. The core part 30 and the switch part 20 may be electrically and physically separated from each other by the insulating plate 13 and the support plate 14.

The movable contact part 40 is positioned between the core part 30 and the switch part 20. The movable contact part 40 may be moved by a driving force applied by the core part 30. Accordingly, the movable contact 43 and the fixed contact 22 may be brought into contact with each other so that the direct current relay 1 may be energizing electric current.

The core part 30 includes a stationary core 31, a movable core 32, a yoke 33, a bobbin 34, a coil 35, a return spring 36, and a cylinder 37.

The stationary core 31 is magnetized by a magnetic field generated in the coil 35 to generate an electromagnetic attraction force. By the electromagnetic attraction force, the movable core 32 is moved toward the stationary core 31 (upward direction in FIG. 3).

The stationary core 31 is not moved. That is, the stationary core 31 is fixedly coupled to the support plate 14 and the cylinder 37.

The stationary core 31 may be provided in any form capable of generating electromagnetic force by being magnetized by a magnetic field. In an embodiment, the stationary core 31 may be provided as a permanent magnet or an electromagnet and the like.

The stationary core 31 is partially accommodated in an upper space inside the cylinder 37. In addition, the outer circumference of the stationary core 31 is in contact with the inner circumference of the cylinder 37.

The stationary core 31 is located between the support plate 14 and the movable core 32.

A through hole (not shown) is formed at the center of the stationary core 31. The shaft 44 is through-coupled to the through hole (not shown) so as to be movable up and down.

The stationary core 31 is positioned to be spaced apart from the movable core 32 by a predetermined distance. Accordingly, the distance that the movable core 32 may be moved toward the stationary core 31 may be limited to the predetermined distance. Accordingly, the predetermined distance may be defined as "travel distance of the movable core 32".

One end of the return spring 36, that is, the upper end in the illustrated embodiment, is in contact with the lower side of the stationary core 31. When the stationary core 31 is magnetized and the movable core 32 is moved upward, the return spring 36 is compressed and restoring force is stored.

Accordingly, when the application of the control power is released and the magnetization of the stationary core 31 is terminated, the movable core 32 may be returned to downward again by the restoring force.

When the control power is applied, the movable core 32 is moved toward the stationary core 31 by electromagnetic attraction force generated by the stationary core 31.

As the movable core 32 is moved, the shaft 44 coupled to the movable core 32 is moved in the direction toward the stationary core 31, that is, upward in the illustrated embodiment. In addition, as the shaft 44 is moved, the movable contact part 40 coupled to the shaft 44 is moved upward.

Accordingly, the fixed contact 22 and the movable contact 43 may be brought into contact with each other so that the direct current relay 1 may be energizing electric current with an external power source or a load.

The movable core 32 may be provided in any form capable of being subjected to attraction by electromagnetic force. In an embodiment, the movable core 32 may be formed of a magnetic material or may be provided as a permanent magnet or an electromagnet and the like.

The movable core 32 is accommodated inside the cylinder 37. In addition, the movable core 32 may be moved in the longitudinal direction of the cylinder 37 inside the cylinder 37, that is, in a vertical direction in the illustrated embodiment.

Specifically, the movable core 32 may be moved in a direction toward the stationary core 31 and in a direction away from the stationary core 31.

The movable core 32 is coupled to the shaft 44. The movable core 32 may be moved integrally with the shaft 44. When the movable core 32 is moved upward or downward, the shaft 44 is also moved upward or downward. Accordingly, the movable contact 43 is also moved upward or downward.

The movable core 32 is located below the stationary core 31. The movable core 32 is spaced apart from the stationary core 31 by a predetermined distance. The predetermined distance is the distance at which the movable core 32 may be moved in the vertical direction as described above.

The movable core 32 is formed extending in the longitudinal direction. Inside the movable core 32, a hollow part extending in the longitudinal direction is formed recessed by a predetermined distance. The lower part of the return spring 36 and the shaft 44 coupled through the return spring 36 are partially accommodated in the hollow part.

A through hole is formed through the lower side of the hollow part in the longitudinal direction. The hollow part and the through hole communicate with each other. A lower end of the shaft 44 inserted into the hollow part may progress toward the through hole.

At the lower end of the movable core 32, a space part is formed recessed by a predetermined distance. The space part communicates with the through hole. The lower head portion of the shaft 44 is located in the space part.

The yoke 33 forms a magnetic circuit as a control power is applied. The magnetic circuit formed by the yoke 33 may be configured to control the direction of the magnetic field formed by the coil 35.

Accordingly, when the control power is applied, the coil 35 may generate a magnetic field in a direction in which the movable core 32 is moved toward the stationary core 31. The yoke 33 may be formed of a conductive material capable of energizing electric current.

The yoke 33 is accommodated inside the lower frame 12. The yoke 33 surrounds the coil 35. The coil 35 may be accommodated inside the yoke 33 to be spaced apart from the inner circumferential surface of the yoke 33 by a predetermined distance.

The bobbin 34 is accommodated inside the yoke 33. That is, the yoke 33, the coil 35, and the bobbin 34 around which the coil 35 is wound are sequentially arranged in a radially inward direction from the outer circumference of the lower frame 12.

The upper side of the yoke 33 is in contact with the support plate 14. In addition, the outer circumference of the yoke 33 may be positioned to contact the inner circumference of the lower frame 12 or to be spaced apart from the inner circumference of the lower frame 12 by a predetermined distance.

The coil 35 is wound around the bobbin 34. The bobbin 34 is accommodated inside the yoke 33.

The bobbin 34 may include a flat plate-shaped upper portion and a flat plate-shaped lower portion, and a cylindrical pillar part extending in a longitudinal direction and connecting the upper portion and the lower portion. That is, the bobbin 34 has a bobbin shape.

An upper portion of the bobbin 34 is in contact with a lower side of the support plate 14. The coil 35 is wound around the pillar part of the bobbin 34. The thickness of the coil 35 to be wound may be equal to or smaller than e diameters of the upper and lower portions of the bobbin 34.

A hollow part extending in the longitudinal direction is formed through the pillar part of the bobbin 34. The cylinder 37 may be accommodated in the hollow part. The pillar part of the bobbin 34 may be arranged to have the same central axis as the stationary core 31, the movable core 32, and the shaft 44.

The coil 35 generates a magnetic field by an applied control power. The stationary core 31 may be magnetized by a magnetic field generated by the coil 35, and an electromagnetic attraction force may be applied to the movable core 32.

The coil 35 is wound around the bobbin 34. Specifically, the coil 35 is wound around the pillar part of the bobbin 34 and stacked radially outward of the pillar part. The coil 35 is accommodated inside the yoke 33.

When the control power is applied, the coil 35 generates a magnetic field. In this case, the intensity or direction or the like of the magnetic field generated by the coil 35 may be controlled by the yoke 33. The stationary core 31 is magnetized by the magnetic field generated by the coil 35.

When the stationary core 31 is magnetized, the movable core 32 is subjected to an electromagnetic force, that is, an attraction force, in a direction toward the stationary core 31, Accordingly, the movable core 32 is moved in a direction toward the stationary core 31, that is, upward in the illustrated embodiment.

The return spring 36 provides a restoring force for returning the movable core 32 to its original position when application of the control power is released after the movable core 32 is moved toward the stationary core 31.

As the movable core 32 is moved toward the stationary core 31 the return spring 36 is compressed and stores a restoring force. At this time, the stored restoring force is preferably smaller than the electromagnetic attraction force applied to the movable core 32 after the stationary core 31 is magnetized. This is to prevent the movable core 32 from being arbitrarily returned to its original position by the return spring 36 while the control power is applied.

When the application of the control power is released, the movable core 32 receives a restoring force by the return spring 36. Of course, gravity due to the empty weight of the movable core 32 may also act on the movable core 32. Accordingly, the movable core 32 may be moved in a direction away from the stationary core 31 and returned to its original position.

The return spring 36 may be provided in any shape capable of deforming, storing restoring force, returning to its original shape, and transmitting the restoring force to the outside. In an embodiment, the return spring 36 may be provided as a coil spring.

A shaft 44 is coupled through the return spring 36. The shaft 44 may be moved in the vertical direction regardless of the shape deformation of the return spring 36 in a state in which the return spring 36 is coupled.

The return spring 36 is accommodated in a hollow part formed recessed on the upper side of the movable core 32. In addition, one end of the return spring 36 facing the stationary core 31, that is, the upper end in the illustrated embodiment, is accommodated in a hollow part formed recessed in the lower side of the stationary core 31.

The cylinder 37 accommodates the stationary core 31, the movable core 32, the return spring 36, and the shaft 44. The movable core 32 and the shaft 44 may be moved upward and downward direction inside the cylinder 37.

The cylinder 37 is located in the hollow part formed in the pillar part of the bobbin 34. The upper end of the cylinder 37 is in contact with the lower surface of the support plate 14.

The side surface of the cylinder 37 is in contact with the inner circumferential surface of the pillar part of the bobbin 34. An upper opening of the cylinder 37 may be sealed by the stationary core 31. The lower surface of the cylinder 37 may be in contact with the inner surface of the lower frame 12, (4) Description of the Movable Contact Part 40

The movable contact part 40 includes the movable contact 43 and a configuration for moving the movable contact 43. The direct current relay 1 may be energizing electric current with an external power source or a load by the movable contact part 40.

The movable contact part 40 is accommodated in the inner space of the upper frame 11. In addition, the movable contact part 40 is accommodated in the arc chamber 21 to be movable vertically.

The fixed contact 22 is positioned above the movable contact part 40. The movable contact part 40 is accommodated in the arc chamber 21 to be movable in a direction toward the fixed contact 22 and in a direction away from the fixed contact 22.

A core part 30 is positioned below the movable contact part 40. The movement of the movable contact part 40 may be achieved by the movement of the movable core 32.

The movable contact part 40 includes a housing 41, a cover 42, a movable contact 43, a shaft 44 and an elastic part 45.

The housing 41 accommodates the movable contact 43 and the elastic part 45 elastically supporting the movable contact 43.

In the illustrated embodiment, one side of the housing 41 and the other side opposite thereto are open. A movable contact 43 may be inserted through the open portion.

The open side surface of the housing 41 may be configured to surround the accommodated movable contact 43.

The cover 42 is provided on the upper side of the housing 41. The cover 42 covers the upper surface of the movable contact 43 accommodated in the housing 41.

The housing 41 and the cover 42 are preferably formed of an insulating material to prevent unintentional electric current energization. In an embodiment, the housing 41 and the cover 42 may be formed of a synthetic resin or the like.

The lower side of the housing 41 is connected to the shaft 44. When the movable core 32 connected to the shaft 44 is moved upward or downward, the housing 41 and the movable contact 43 accommodated therein may also be moved upward or downward.

The housing 41 and the cover 42 may be coupled by any member. In an embodiment, the housing 41 and the cover 42 may be coupled by a fastening member (not shown) such as a bolt or nut.

The movable contact 43 comes into contact with the fixed contact 22 according to the application of control power, so that the direct current relay 1 is made energizing electric current with an external power supply and load. In addition, the movable contact 43 is separated from the fixed contact 22 when the application of control power is released, so that the direct current relay 1 is made not energizing electric current with an external power supply and load.

The movable contact 43 is positioned adjacent to the fixed contact 22.

The upper side of the movable contact 43 is partially covered by the cover 42. In an embodiment, a portion of the upper surface of the movable contact 43 may be in contact with the lower surface of the cover 42.

The lower side of the movable contact 43 is elastically supported by the elastic part 45. To prevent the movable contact 43 from moving arbitrarily downward, the elastic part 45 may elastically support the movable contact 43 in a compressed state by a predetermined distance.

The movable contact 43 extends in the longitudinal direction, that is, left and right direction in the illustrated embodiment. That is, the length of the movable contact 43 is longer than the width. Accordingly, opposite ends in the longitudinal direction of the movable contact 43 accommodated in the housing 41 are exposed to the outside of the housing 41.

Contact protrusion portions protruding upward by a predetermined distance may be formed at the opposite ends. The fixed contact 22 is in contact with the contact protrusion portion.

The contact protrusion portion may be formed at a position corresponding to each of the fixed contacts 22*a* and 22*b*. Accordingly, the moving distance of the movable contact 43 is reduced, and contact reliability between the fixed contact 22 and the movable contact 43 can be improved.

The width of the movable contact 43 may be the same as the distance at which each side surface of the housing 41 is spaced apart from each other. That is, when the movable contact 43 is accommodated in the housing 41, opposite side surfaces of the movable contact 43 in the width direction may contact inner surfaces of each side surface of the housing 41.

Accordingly, the state in which the movable contact 43 is accommodated in the housing 41 can be stably maintained.

The shaft 44 transmits a driving force generated as the core part 30 is operated to the movable contact part 40. Specifically, the shaft 44 is connected to the movable core 32 and the movable contact 43. When the movable core 32 is moved upward or downward, the movable contact 43 may be also moved upward or downward by the shaft 44.

The shaft 44 extends in the longitudinal direction, that is, vertical direction in the illustrated embodiment.

The lower end of the shaft 44 is inserted into and coupled to the movable core 32. When the movable core 32 is moved in the vertical direction, the shaft 44 may be moved together with the movable core 32 in the vertical direction.

The body part of the shaft 44 is coupled to the stationary core 31 so as to be movable up and down. The return spring 36 is coupled through the body part of the shaft 44.

The upper end of the shaft 44 is coupled to the housing 41. When the movable core 32 is moved, the shaft 44 and the housing 41 may be moved together.

Upper and lower ends of the shaft 44 may be formed to have larger diameters than the body part of the shaft. Accordingly, the shaft 44 may be stably coupled to the housing 41 and the movable core 32.

The elastic part 45 elastically supports the movable contact 43. When the movable contact 43 comes into contact with the fixed contact 22, the movable contact 43 tends to be spaced apart from the fixed contact 22 by electromagnetic repulsive force.

At this time, the elastic part 45 elastically supports the movable contact 43 to prevent the movable contact 43 from being arbitrarily separated from the fixed contact 22.

The elastic part 45 may be provided in any form capable of storing a restoring force by deformation of a shape and providing the stored restoring force to other members. In an embodiment, the elastic part 45 may be provided as a coil spring.

One end of the elastic part 45 facing the movable contact 43 is in contact with the lower side of the movable contact 43. In addition, the other end opposite to the one end is in contact with the upper side of the housing 41.

The elastic part 45 may elastically support the movable contact 43 in a state in which a restoring force is stored after being compressed by a predetermined distance. Accordingly, even if an electromagnetic repulsive force is generated between the movable contact 43 and the fixed contact 22, the movable contact 43 is not moved arbitrarily.

For stable coupling of the elastic part 45, a protrusion portion (not shown) inserted into the elastic part 45 may protrude from the lower side of the movable contact 43, Similarly, a protrusion portion (not shown) inserted into the elastic part 45 may protrude from the upper side of the housing 41.

3. Description of the Arc Path Forming Parts 100, 200, and 300 According to an Embodiment of the Present Disclosure Referring to FIGS. 5 to 22, path forming parts 100, 200, and 300 according to various embodiments of the present disclosure are illustrated. Each of the arc path forming parts 100, 200, and 300 forms a magnetic field inside the arc chamber 21. An electromagnetic force is formed inside the arc chamber 21 by the electric current energizing through the direct current relay 1 and the formed magnetic field.

An arc generated as the fixed contact 22 and the movable contact 43 are separated is moved out of the arc chamber 21 by the formed electromagnetic force. Specifically, the generated arc is moved along the direction of the formed electromagnetic force. Accordingly, it can be said that the arc path forming parts 100, 200, and 300 form an arc path A.P, which is a path through which the generated arc flows.

The arc path forming part 100, 200, or 300 is located in a space formed inside the upper frame 11. The arc path forming part 100, 200, or 300 is disposed surrounding the arc chamber 21. In other words, the arc chamber 21 is located inside the arc path forming part 100, 200, or 300.

The fixed contact 22 and the movable contact 43 are positioned inside the arc path forming part 100, 200, or 300. An arc generated when the fixed contact 22 and the movable contact 43 are separated may be directed by the electromagnetic force formed by the arc path forming part 100, 200, or 300.

The arc path forming parts 100, 200, and 300 according to various embodiments of the present disclosure include a Halbach array or a magnet part. The Halbach array or magnet part forms a magnetic field inside the arc path forming part 100 in which the fixed contact 22 and the movable contact 43 are accommodated. At this time, the Halbach array or magnet part may form a magnetic field by itself, and also between each other.

The magnetic field formed by the Halbach array and the magnet part forms an electromagnetic force together with an electric current energizing through the fixed contact 22 and the movable contact 43. The formed electromagnetic force directs an arc generated when the fixed contact 22 and the movable contact 43 are spaced apart.

In this case, the arc path forming part 100, 200, or 300 forms an electromagnetic force in a direction away from the central portion C of the space part 115, 215, or 315, Accordingly, the arc path A.P is also formed in a direction away from the central portion C of the space part.

As a result, each component provided in the direct current relay 1 may not be damaged by the generated arc. Furthermore, the generated arc can be quickly discharged to the outside of the arc chamber 21.

Hereinafter, the configuration of each of the arc path forming parts 100, 200, 300 and the arc path A.P formed by each of the arc path forming parts 100, 200, 300 will be described in detail with reference to the accompanying drawings.

The arc path forming parts 100, 200, and 300 according to various embodiments described below may have a Halbach array positioned on one or more sides of left and right sides.

As will be described later, the rear side may be defined as a direction adjacent to the first surfaces 111, 211, and 311, and the front side adjacent to the second surfaces 112, 212, and 312.

In addition, the left side may be defined as a direction adjacent to the third surfaces 113, 213, and 313, and the right side adjacent to the fourth surfaces 114, 214, and 314.

(1) Description of Arc Path Forming Part 100 According to an Embodiment of the Present Disclosure Hereinafter, the arc path forming part 100 according to an embodiment of the present disclosure will be described in detail with reference to FIGS. 5 to 10.

Figure 5:
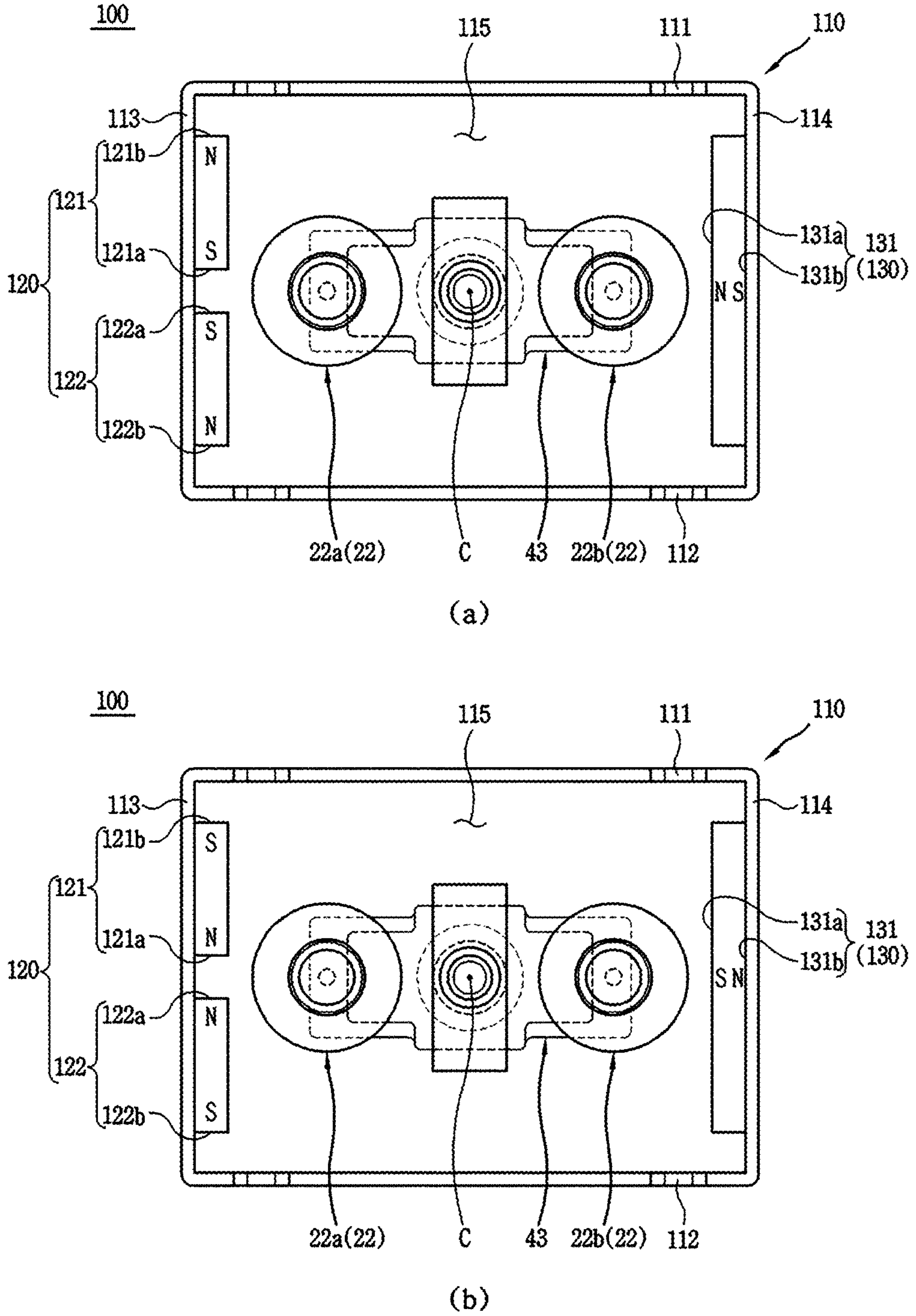
FIGS. 5 and 6 are plan views illustrating an arc path forming part according to an exemplary embodiment of the present disclosure.
Figure 6:
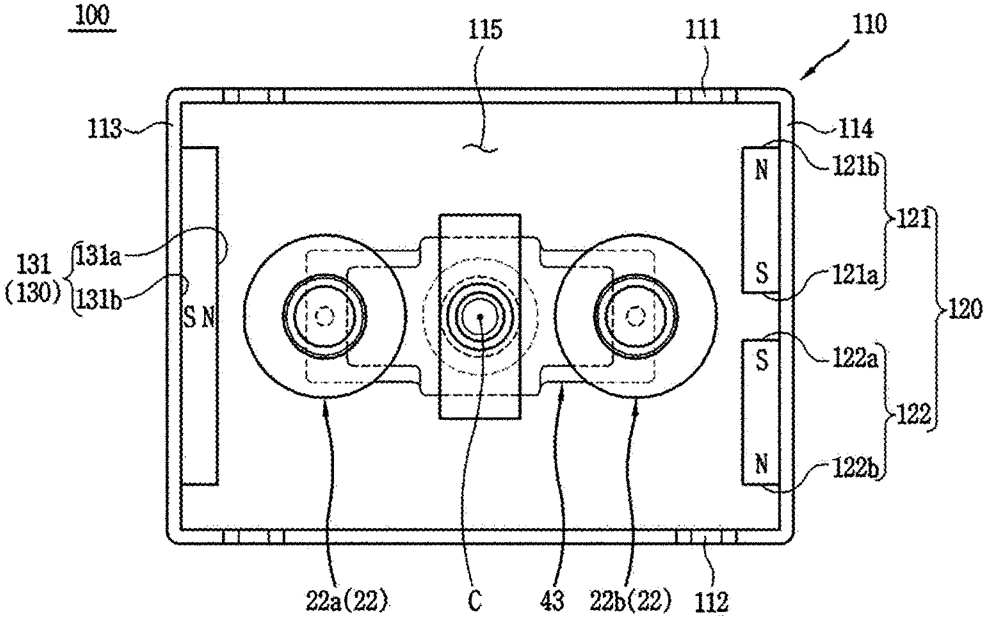
Figure 6:
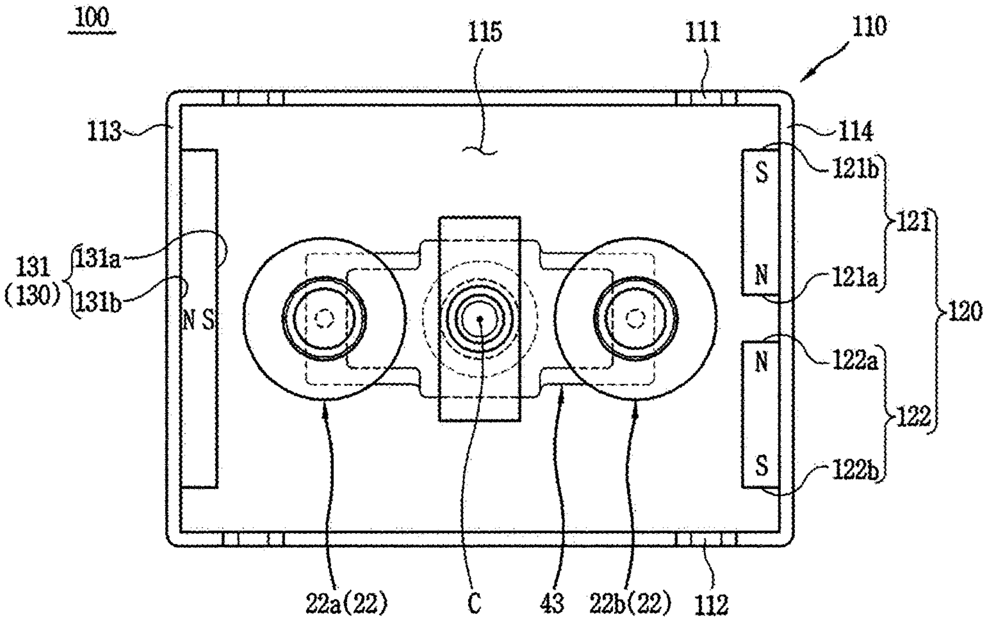

Referring to FIGS. 5 to 6, the arc path forming part 100 according to the illustrated embodiment includes a magnet frame 110, a first magnet part 120 and a second magnet part 130.

The magnet frame 110 forms the frame of the arc path forming part 100. The first and second magnet parts 120 and 130 are disposed on the magnet frame 110. In an embodiment, the first and second magnet parts 120 and 130 may be coupled to the magnet frame 110.

The magnet frame 110 has a rectangular cross-section extending in the longitudinal direction, that is, left and right directions in the illustrated embodiment. The shape of the magnet frame 110 may be changed according to the shape of the upper frame 11 and the arc chamber 21.

The magnet frame 110 includes a first surface 111, a second surface 112, a third surface 113, a fourth surface 114, and a space part 115.

The first surface 111, the second surface 112, the third surface 113, and the fourth surface 114 form an outer circumferential surface of the magnet frame 110. That is, the first surface 111, the second surface 112, the third surface 113, and the fourth surface 114 function as walls of the magnet frame 110.

The outer sides of the first surface 111, the second surface 112, the third surface 113, and the fourth surface **114*b* may be in contact with or fixedly coupled to the inner surface of the upper frame 11**.

In the illustrated embodiment, the first surface 111 forms a rear side surface. The second surface 112 forms a front side surface and is opposite to the first surface 111. In addition, the third surface 113 forms a left side surface. The fourth surface 114 forms a right side surface and is opposite to the third surface 113, That is, the first surface 111 and the second surface 112 face each other with the space part 115 interposed therebetween. In addition, the third surface 113 and the fourth surface 114 face each other with the space part 115 interposed therebetween.

The first surface 111 is continuous with the third surface 113 and the fourth surface 114. The first surface 111 may be coupled to the third surface 113 and the fourth surface 114 at a predetermined angle. In an embodiment, the predetermined angle may be a right angle.

The second surface 112 is continuous with the third surface 113 and the fourth surface 114. The second surface 112 may be coupled to the third surface 113 and the fourth surface 114 at a predetermined angle. In an embodiment, the predetermined angle may be a right angle.

Each corner where the first surface 111 to the fourth surface 114 are connected to each other may be tapered.

A fastening member (not shown) may be provided to couple the surfaces 111, 112, 113, and 114 with the first and second magnet parts 120 and 130.

Although not illustrated, an arc discharge hole (not illustrated) may be formed through at least one of the first surface 111, the second surface 112, the third surface 113 and the fourth surface 114. The arc discharge hole (not shown) may function as a passage through which the arc generated in the space part 115 is discharged.

A space surrounded by the first surface 111 to the fourth surface 114 may be defined as the space part 115.

The fixed contact 22 and the movable contact 43 are accommodated in the space part 115. In addition, the arc chamber 21 is accommodated in the space part 115.

In the space part 115, the movable contact 43 may be moved in a direction toward the fixed contact 22 (i.e., a downward direction) or away from the fixed contact 22 (i.e., an upward direction).

In addition, the path A.P of the arc generated in the arc chamber 21 is formed in the space part 115. This is achieved by a magnetic field formed by the first and second magnet parts 120 and 130.

A central portion of the space part 115 may be defined as a central portion C. The straight line distance from each corner where the first to fourth surfaces 111, 112, 113, and 114 are connected to each other to the central portion C may be the same.

The central portion C is located between the first fixed contact **22*a* and the second fixed contact 22*h*. In addition, the center portion of the movable contact part 40 is positioned vertically below the central portion C. That is, central portions of the housing 41, the cover 42, the movable contact 43, the shaft 44, the elastic part 45** or the like are positioned vertically below the central portion C.

Accordingly, when the generated arc is moved toward the central portion C, damage to the components may occur. To prevent this, the arc path forming part 100 according to the present embodiment includes the first and second magnet parts 120 and 130.

The first magnet part 120 may form a magnetic field together with other magnetic materials. In the illustrated embodiment, the first magnet part 120 may form a magnetic field together with the second magnet part 130.

The first magnet part 120 may be positioned adjacent to one of the third and fourth surfaces 113 and 114. In an embodiment, the first magnet part 120 may be coupled to an inner side (i.e., in a direction toward the space part 115) of any one of the surfaces.

In the embodiment shown in FIG. 5, the first magnet part 120 is disposed inside the third surface 113 and adjacent to the third surface 113, in the embodiment shown in FIG. 6, the first magnet part 120 may be disposed inside the fourth surface 114 and adjacent to the fourth surface 114.

The first magnet part 120 is disposed to face the second magnet part 130. In the embodiment shown in FIG. 5, the first magnet part 120 is disposed to face the second magnet part 130 located inside the fourth surface 114. In the embodiment shown in FIG. 6, the first magnet part 120 is disposed to face the second magnet part 130 located inside the third surface 113.

The space part 115 and the fixed contact 22 and the movable contact 43 accommodated in the space part 115 are positioned between the first magnet part 120 and the second magnet part 130.

The first magnet part 120 may strengthen the intensity of the magnetic field formed by itself and the magnetic field formed together with the second magnet part 130. Since the direction of the magnetic field formed by the first magnet part 120 and the process of strengthening the magnetic field are well-known techniques, a detailed description thereof will be omitted.

In the illustrated embodiment, a plurality of magnetic materials constituting the first magnet part 120 are arranged side by side from the front side to the rear side. In addition, the plurality of magnetic materials constituting the first magnet part 120 extend in the front-rear direction.

That is, the plurality of magnetic materials constituting the first magnet part 20 are arranged side by side in the extension direction.

In the illustrated embodiment, the first magnet part 120 includes a first magnet block 121 and a second magnet block 122. It will be understood that the plurality of magnetic materials constituting the first magnet part 120 are named magnet blocks 121 and 122, respectively.

The first and second magnet blocks 121 and 122 may be formed of a magnetic material. In an embodiment, the first and second magnet blocks 121 and 122 may be provided as permanent magnets or electromagnets or the like.

The first and second magnet blocks 121 and 122 may be arranged side by side in one direction. In the illustrated embodiment, the first and second magnet blocks 121 and 122 are disposed side by side in a direction in which the third surface 113 extends, that is, in the front and rear direction.

Among the first and second mag net blocks 121 and 122, the first magnet block 121 is disposed on the rear side and the second magnet block 122 is disposed on the front side. In the illustrated embodiment, the first and second magnet blocks 121 and 122 are spaced apart from each other.

In the above embodiment, the space in which the first and second magnet blocks 121 and 122 are spaced apart from each other may overlap the fixed contact 22 along the left-right direction, that is, along the direction in which the first surface 111 or the second surface 112 extends.

Alternatively, the first and second magnet blocks 121 and 122 may be in contact with each other. In the above embodiment, it will be understood that the first magnet part 120 may function as a Halbach array.

The first and second magnet blocks 121 and 122 include a plurality of surfaces.

Specifically, the first magnet block 121 includes a first inner surface 121*a* facing the second magnet block 122 and a first outer surface 121*b* opposite to the second magnet block 122.

The second magnet block 122 includes a second inner surface 122*a* facing the first magnet block 121 and a second outer surface 122*b* opposite to the first magnet block 121.

The plurality of surfaces of each of the magnet blocks 121 and 122 may be magnetized according to a predetermined rule.

That is, the first inner surface 121*a* and the second inner surface 122*a* are magnetized to the same polarity. In addition, the first outer surface 121*b* and the second outer surface 122*b* are each magnetized to a polarity different from the above polarity.

In this case, the first inner surface 121*a* and the second inner surface 122*a* may be magnetized to the same polarity as the first outer surface 131*b* of the second magnet part 130. That is, the first inner surface 121*a* and the second inner surface 122*a* are magnetized to a polarity different from that of the first inner surface 131*a* of the second magnet part 130.

Likewise, the first outer surface 121*b* and the second outer surface 122*h* are magnetized to the same polarity as the first inner surface 131*a* of the second magnet part 130. That is, the first inner surface 121*a* and the second inner surface 122*a* a magnetized to a polarity different from that of the first outer surface 131*b* of the second magnet part 130.

In the embodiments shown in (a) of FIG. 5 and (a) of FIG. 6, the first inner surface 121*a* and the second inner surface 122*a* are each magnetized to the S pole. In the above embodiment, the first inner surface 131*a* of the second magnet part 130 is magnetized to the N pole different from the above polarity.

In addition, in the embodiments shown in (b) of FIG. 5 and (h) of FIG. 6, the first inner surface 121*a* and the second inner surface 122*a* are each magnetized to the N pole. In the above embodiment, the first inner surface 131*a* of the second magnet part 130 is magnetized to the S pole different from the above polarity.

The second magnet part 130 may form a magnetic field together with other magnetic materials. In the illustrated embodiment, the second magnet part 130 may form a magnetic field together with the first magnet part 120.

The second magnet part 130 may be positioned adjacent to the other one of the third and fourth surfaces 113 and 114. In an embodiment, the second magnet part 130 may be coupled to an inner side (i.e., in a direction toward the space part 115) of the other one of the surfaces.

In the embodiment shown in FIG. 5, the second magnet part 130 is disposed inside the fourth surface 114 and adjacent to the fourth surface 114. In the embodiment shown in FIG. 6, the second magnet part 130 may be disposed inside the third surface 113 and adjacent to the third surface 113.

The second magnet part 130 is disposed to face the first magnet part 120 with the space part 115 interposed therebetween. In the embodiment shown in FIG. 5, the second magnet part 130 is disposed to face the first magnet part 120 located inside the third surface 113. In the embodiment shown in FIG. 6, the second magnet part 130 is disposed to face the first magnet part 120 located inside the fourth surface 114.

The space part 115 and the fixed contact 22 and the movable contact 43 accommodated in the space part 115 are positioned between the second magnet part 130 and the first magnet part 120.

The second magnet part 130 may strengthen the intensity of the magnetic field formed by itself and the magnetic field formed together with the first magnet part 120. Since the direction of the magnetic field formed by the second magnet part 130 and the process of strengthening the magnetic field are well-known techniques, a detailed description thereof will be omitted.

In an embodiment, the second magnet part 130 may be formed to have stronger magnetism than each of the magnet blocks 121 and 122 constituting the first magnet part 120. This is due to the fact that the number of magnet units provided in the second magnet part 130 is smaller than the number of magnet blocks provided in the first magnet part 120.

In an embodiment, the second magnet part 130 may be provided as an Nd magnet (Neodymium Magnet) or an NIB magnet (Neodymium-Iron-Boron Magnet).

In the illustrated embodiment, the second magnet part 130 includes a first magnet unit 131. It will be understood that the magnetic material constituting the second magnet part 130 is named the magnet unit 131.

The first magnet unit 131 may be formed of a magnetic material. In an embodiment, the first magnet unit 131 may be provided as a permanent magnet or an electromagnet or the like.

The first magnet unit 131 may extend in a direction in which the first magnet part 120 extends, that is, in the front and rear direction in the illustrated embodiment. In an embodiment, the first magnet unit 131 may extend by a length longer than each of the magnet blocks 121 and 122.

The first magnet unit 131 may be disposed to overlap each of the fixed contacts 22*a* and 22*b* in a direction toward the third surface 113, that is, in the left and right directions in the illustrated embodiment. In other words, the first magnet unit 131 may be disposed to overlap the fixed contact 22 along the direction in which the first surface 111 or the second surface 112 extends.

The first magnet unit 131 includes a plurality of surfaces.

Specifically, the first magnet unit 131 includes a first inner surface 131*a* facing the space part 115 or the first magnet part 120 and a first outer surface 131*b* opposite to the space part 115 or the first magnet part 120.

The plurality of surfaces of the first magnet unit 131 may be magnetized according to a predetermined rule.

The first inner surface 131*a* and the first outer surface 131*b* are magnetized to different polarities. In this case, the first inner surface 131*a* may be magnetized to the same polarity as each of the outer surfaces 121*b* and 122*b* of the first magnet part 120. In other words, the first inner surface 131*a* may be magnetized to a polarity different from that of each of the inner surfaces 121*a* and 122*a* of the first magnet part 120.

Likewise, the first outer surface 131*b* may be magnetized to the same polarity as each of the inner surfaces 121*a* and 122*a* of the first magnet part 120. In other words, the first outer surface 131*b* may be magnetized to a polarity different from that of each of the outer surfaces 121*b* and 122*b* of the first magnet part 120.

In the embodiments shown in (a) of FIG. 5 and (a) of FIG. 6, the first inner surface 131*a* is magnetized to the N pole. In the above embodiment, the first inner surface 121*a* and the second inner surface 122*a* of the first magnet part 120 are each magnetized to the S pole.

In addition, in the embodiments shown in (b) of FIG. 5 and (b) of FIG. 6, the first inner surface 131*a* is magnetized to the S pole. In the above embodiment, the first inner surface 121*a* and the second inner surface 122*a* of the first magnet part 120 are each magnetized to the N pole.

Accordingly, a magnetic field directed from one of the first magnet part 120 and the second magnet part 130 toward the other magnet part is formed in the space part 115.

Hereinafter, the arc path A.P formed by the arc path forming part 100 according to the present embodiment will be described in detail with reference to FIGS. 7 to 10.

Figure 7:
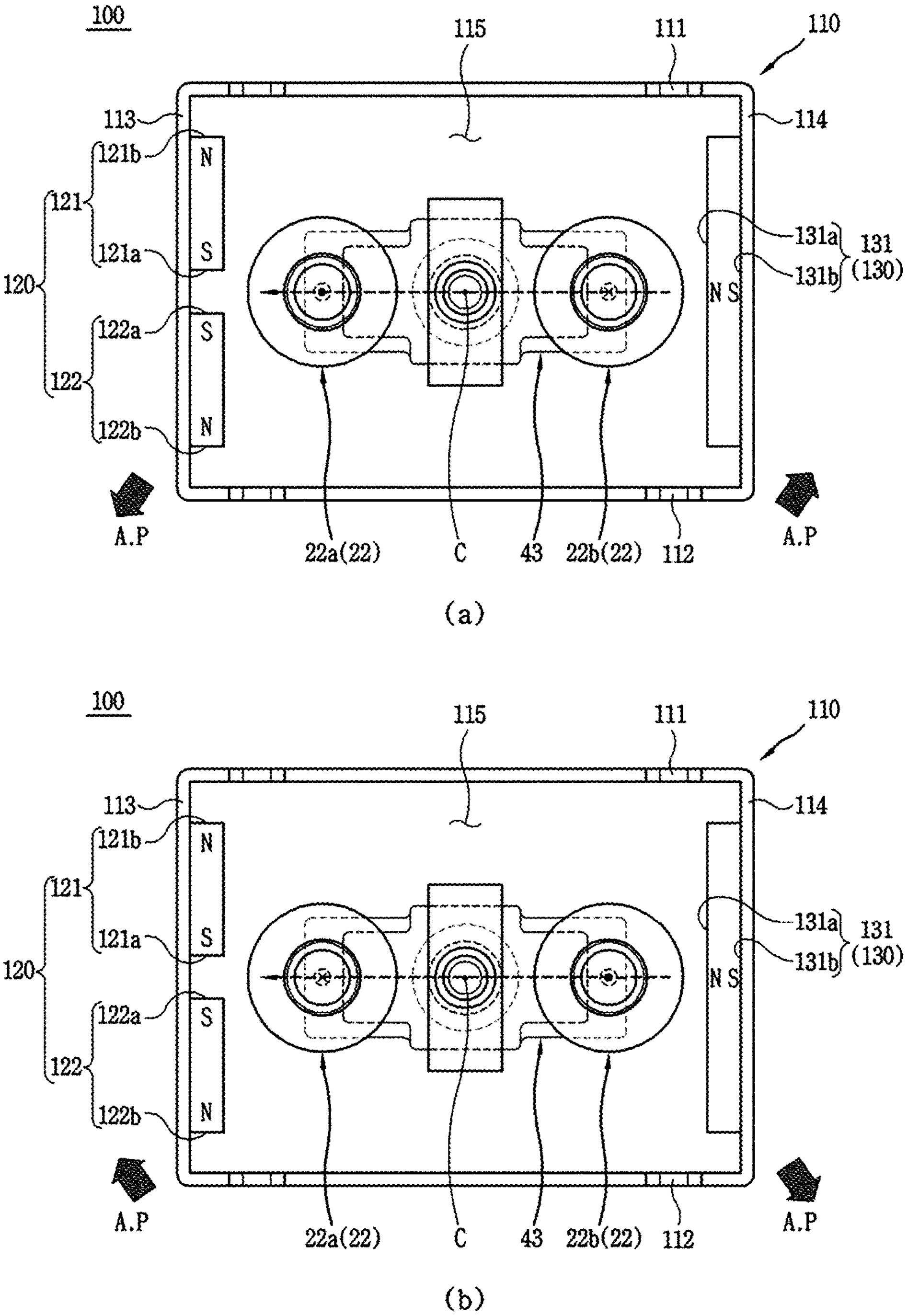
FIGS. 7 to 10 are conceptual views illustrating arc paths formed by the arc path forming part according to the exemplary embodiment of FIGS. 5 and 6.
Figure 9:
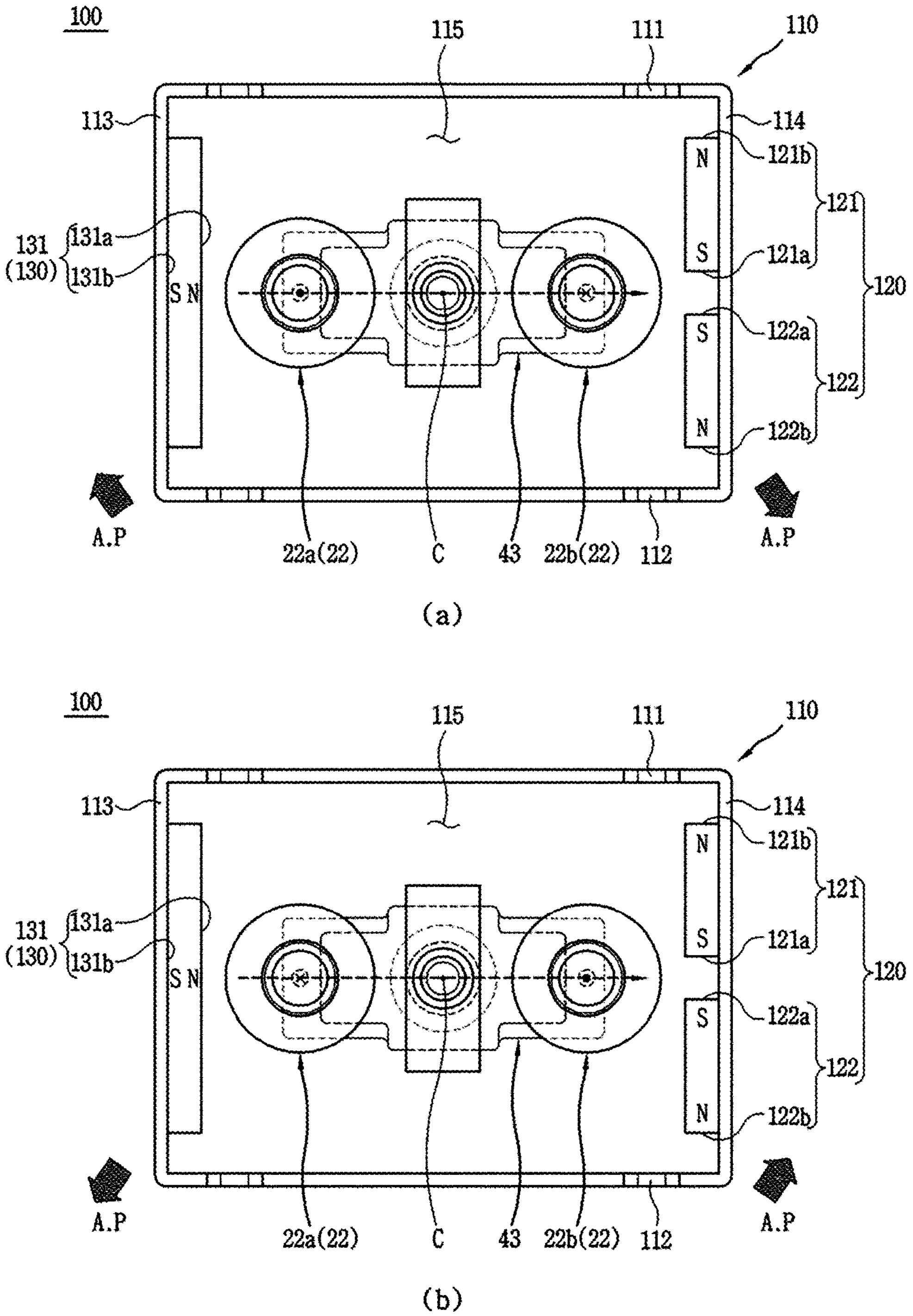

Referring to FIGS. 7 and 9, each of the inner surfaces 121*a* and 122*a* of the first magnet part 120 and the inner surface 131*a* of the second magnet part 130 are magnetized to different polarities.

That is, each of the inner surfaces 121*a* and 122*a* of the first magnet part 120 is magnetized to the S pole, and the inner surface 131*a* of the second magnet part 130 is magnetized to the N pole.

Accordingly, between the second magnet block 122 of the first magnet part 120 and the first magnet unit 131 of the second magnet part 130, a magnetic field is formed in a direction from the first inner surface 131*a* toward the first and second inner surfaces 121*a* and 122*a*.

Figure 8:
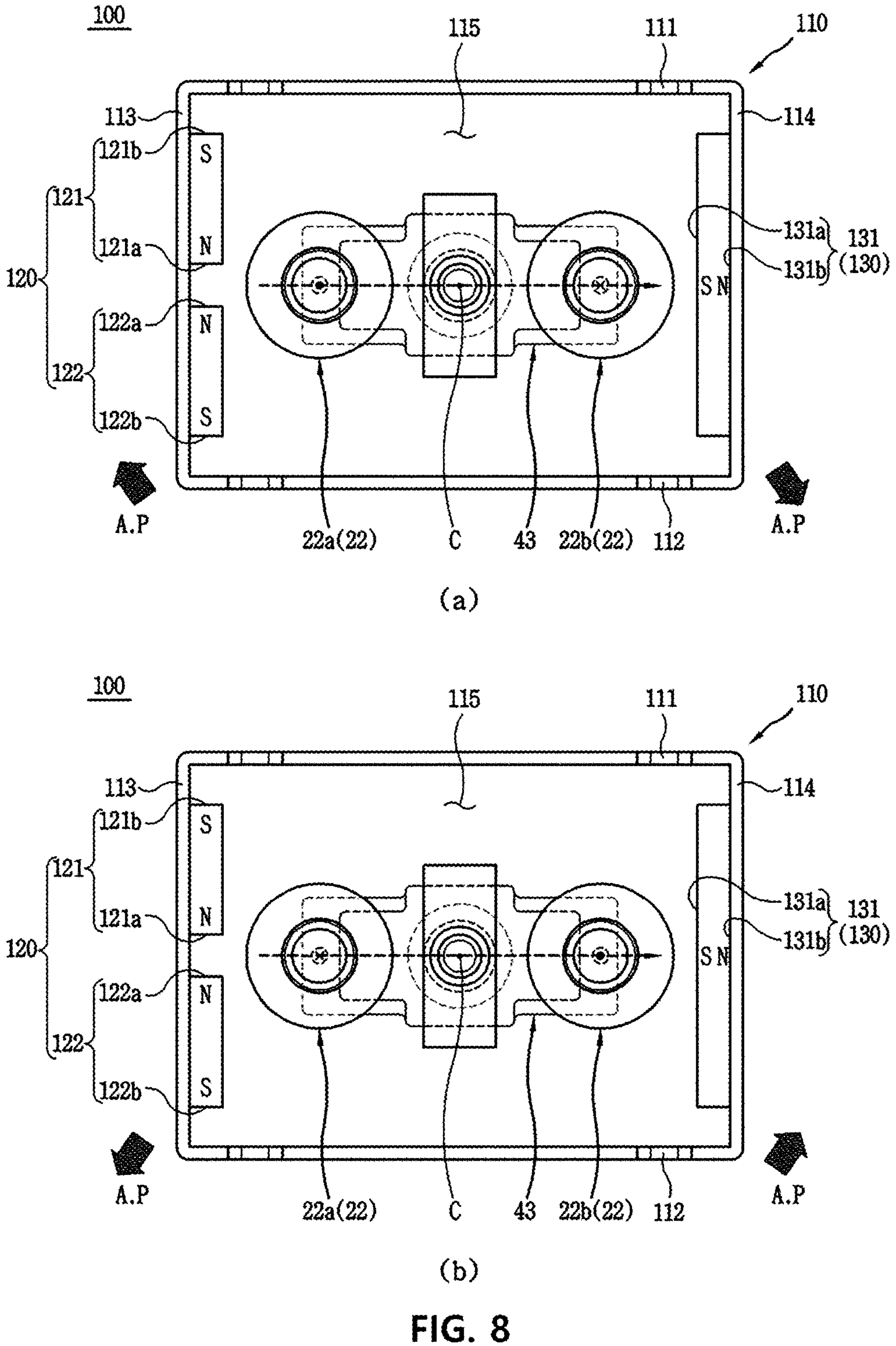
Figure 10:
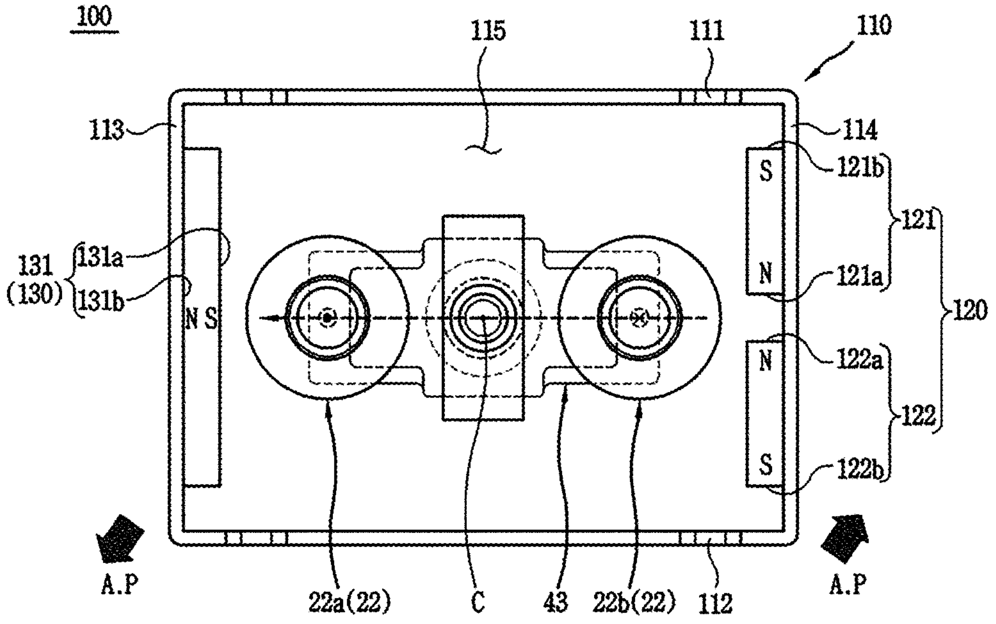
Figure 10:
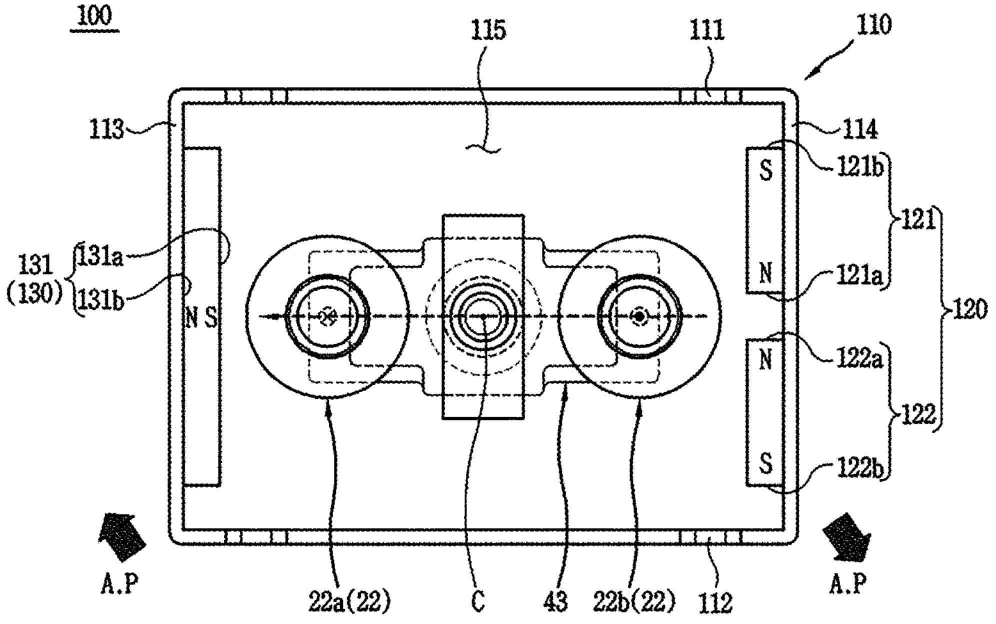

Referring to FIGS. 8 and 10, each of the inner surfaces 121*a* and 122*a* of the first magnet part 120 and the inner surface 131*a* of the second magnet part 130 are magnetized to different polarities.

That is, each of the inner surfaces 121*a* and 122*a* of the first magnet part 120 is magnetized to the N pole, and the inner surface 131*a* of the second magnet part 130 is magnetized to the S pole.

Accordingly, between the second magnet block 122 of the first magnet part 120 and the first magnet unit 131 of the second magnet part 130, a magnetic field is formed in a direction from the first and second inner surfaces 121*a* and 122*a* toward the first inner surface 131*a*.

In the embodiments shown in FIG. 7(*a*), FIG. 8(*a*), FIG. 9(*a*) and FIG. 10(*a*), the direction of the electric current is the direction from the second fixed contact 22*b* through the movable contact 43 to the first fixed contact 22*a*.

When Fleming's rule is applied to the first fixed contact 22*a*, the direction of the electromagnetic force generated near the first fixed contact 22*a* and the arc path A.P. may be known.

That is, in the embodiments shown in FIG. 7(*a*) and FIG. 10(*a*), the electromagnetic force and the arc path A.P. near the first fixed contact 22*a* are formed toward the front left side.

In addition, in the embodiments shown in FIG. 8(*a*) and FIG. 9(*a*), the electromagnetic force and the arc path A.P. near the first fixed contact 22*a* are formed toward the rear left side.

Likewise, when Fleming's rule is applied to the second fixed contact 22*b*, the direction of the electromagnetic force generated near the second fixed contact 22*b* and the arc path A.P. may be known.

That is, in the embodiments shown in FIG. 7(*a*) and FIG. 10(*a*), the electromagnetic force and the arc path A.P. near the second fixed contact 22*b* are formed toward the rear right side.

In addition, in the embodiments shown in FIG. 8(*a*) and FIG. 9(*a*), the electromagnetic force and the arc path A.P. near the second fixed contact 22*h* are formed toward the front right side.

In the embodiments shown in FIG. 7(*h*), FIG. 8(*b*), FIG. 9(*b*) and FIG. 10(*b*), the direction of the electric current is the direction from the first fixed contact 22*a* through the movable contact 43 to the second fixed contact 22*b*.

When Fleming's rule is applied to the first fixed contact 22*a*, the direction of the electromagnetic force generated near the first fixed contact 22*a* and the arc path A.P. may be known.

That is, in the embodiments shown in FIG. 7(*b*) and FIG. 10(*b*), the electromagnetic force and the arc path A.P. near the first fixed contact 22*a* are formed toward the rear left side.

In addition, in the embodiments shown in FIG. 8(*b*) and FIG. 9(*b*), the electromagnetic force and the arc path A.P. near the first fixed contact 22*a* are formed toward the front left side.

Likewise, when Fleming's rule is applied to the second fixed contact 22*b*, the direction of the electromagnetic force generated near the second fixed contact 22*b* and the arc path A.P. may be known.

That is, in the embodiments shown in FIG. 7(*b*) and FIG. 10(*b*), the electromagnetic force and the arc path A.P. near the second fixed contact 22*b* are formed toward the front right side.

In addition, in the embodiments shown in FIG. 8(*b*) and FIG. 9(*b*), the electromagnetic force and the arc path A.P. near the second fixed contact 22*b* are formed toward the rear right side.

Therefore, the arc path forming part 100 according to the present embodiment may form the electromagnetic force and the arc path A.P in a direction away from the central portion C, regardless of the polarity of the first and second magnet parts 120 and 130 or the direction of the electric current energizing through the direct current relay 1.

Moreover, each arc path A.P formed near each of the fixed contacts 22*a* and 22*b* is formed in a direction away from each other.

Accordingly, damage to each component of the direct current relay 1 disposed adjacent to the central portion C can be prevented. Furthermore, the generated arc can be quickly discharged to the outside, so that the operation reliability of the direct current relay 1 can be improved.

(2) Description of Arc Path Forming Part 200 According to Another Embodiment of the Present Disclosure Hereinafter, the arc path forming part 200 according to another embodiment of the present disclosure will be described in detail with reference to FIGS. 11 to 16.

Figure 11:
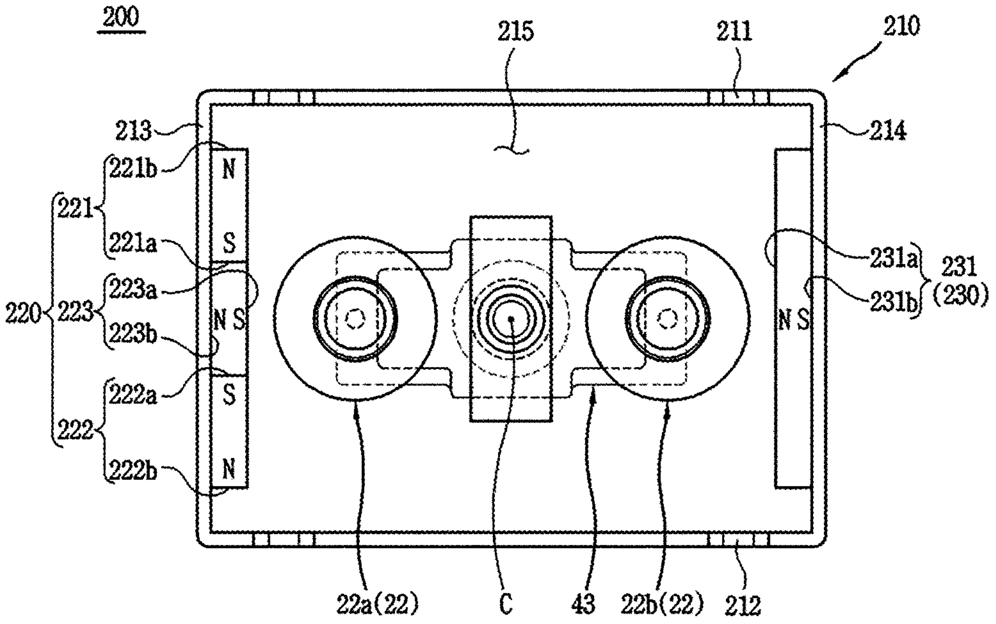
FIGS. 11 and 12 are plan views illustrating an arc path forming part according to another exemplary embodiment of the present disclosure.
Figure 11:
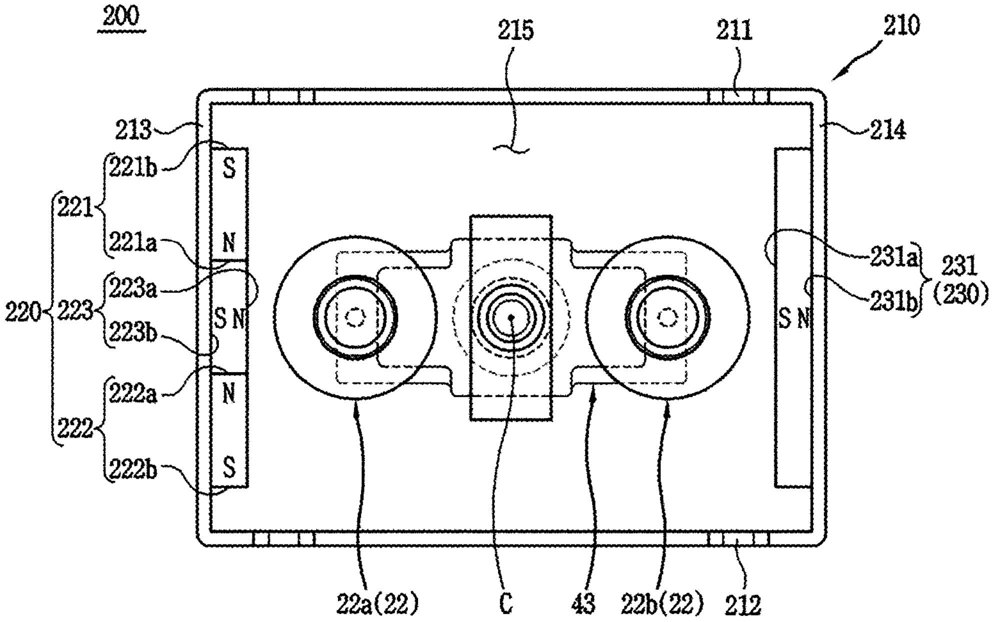
Figure 12:
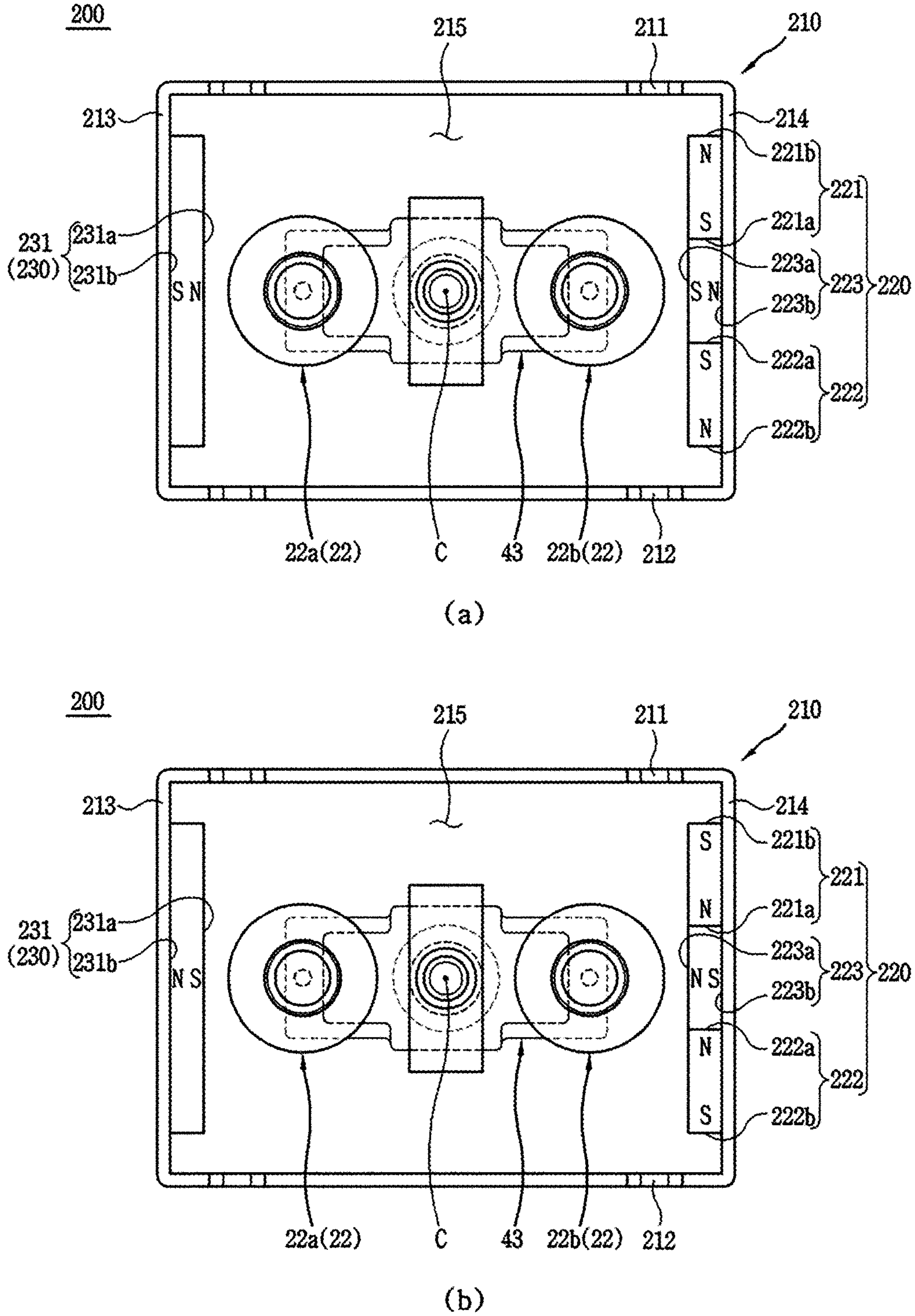

Referring to FIGS. 11 and 12, the arc path forming part 200 according to the illustrated embodiment includes a magnet frame 210, a first magnet part 220 and a second magnet part 230.

The magnet frame 210 according to the present embodiment has the same structure and function as the magnet frame 110 according to the above-described embodiment. However, the first magnet part 220 and the second magnet part 230 disposed on the magnet frame 210 according to the present embodiment are different from the arc path forming part 100 according to the above-described embodiment.

Therefore, the description of the magnet frame 210 will be replaced with the description of the magnet frame 110 according to the above-described embodiment.

The first magnet part 220 may form a magnetic field together with other magnetic materials. In the illustrated embodiment, the first magnet part 220 may form a magnetic field together with the second magnet part 230.

The first magnet part 220 may be positioned adjacent to one of the third and fourth surfaces 213 and 214. In an embodiment, the first magnet part 220 may be coupled to an inner side (i.e., in a direction toward the space part 215) of any one of the surfaces.

In the embodiment shown in FIG. 11, the first magnet part 220 is disposed inside the third surface 213 and adjacent to the third surface 213. In the embodiment shown in FIG. 12, the first magnet part 220 may be disposed inside the fourth surface 214 and adjacent to the fourth surface 214.

The first magnet part 220 is disposed to face the second magnet part 230. In the embodiment shown in FIG. 11, the first magnet part 220 is disposed to face the second magnet part 230 located inside the fourth surface 214. In the embodiment shown in FIG. 12, the first magnet part 220 is disposed to face the second magnet part 230 located inside the third surface 213.

The space part 215 and the fixed contact 22 and the movable contact 43 accommodated in the space part 215 are positioned between the first magnet part 220 and the second magnet part 230.

The first magnet part 220 may strengthen the intensity of the magnetic field formed by itself and the magnetic field formed together with the second magnet part 230. Since the direction of the magnetic field formed by the first magnet part 220 and the process of strengthening the magnetic field are well-known techniques, a detailed description thereof will be omitted.

In the illustrated embodiment, a plurality of magnetic materials constituting the first magnet part 220 are arranged side by side from the front side to the rear side. In addition, the plurality of magnetic materials constituting the first magnet part 220 extend in the front-rear direction.

That is, the plurality of magnetic materials constituting the first magnet part 20 are arranged side by side in the extension direction.

In the illustrated embodiment, the first magnet part 220 includes a first magnet block 221, a second magnet block and a third magnet block 223. It will be understood that the plurality of magnetic materials constituting the first magnet part 220 are named magnet blocks 221, 222 and 223, respectively.

The first to third magnet blocks 221, 222 and 223 may be formed of a magnetic material. In an embodiment, the first to third magnet blocks 221, 222 and 223 may be provided as permanent magnets or electromagnets or the like.

The first to third magnet blocks 221, 222 and 223 may be arranged side by side in one direction. In the illustrated embodiment, the first to third magnet blocks 221, 222 and 223 are disposed side by side in a direction in which the third surface 213 extends, that is, in the front and rear direction.

Among the first to third magnet blocks 221, 222 and 223, the first magnet block 221 is disposed on the rear side and the second magnet block 222 is disposed on the front side. Also, the third magnet block 223 is located between the first magnet block 221 and the second magnet block 222.

In the above embodiment, the third magnet block may overlap the fixed contact 22 along the left-right direction, that is, along the direction in which the first surface 211 or the second surface 212 extends.

In the above embodiment, the first to third magnet blocks 221, 222 and 223 may be in contact with each other. That is, the third magnet block 223 may be in contact with the first magnet block 221 and the second magnet block 222, respectively.

In the above embodiment, it will be understood that the first magnet part 220 may function as a Halbach array.

The first to third magnet blocks 221, 222 and 223 include a plurality of surfaces, respectively.

Specifically, the first magnet block 221 includes a first inner surface 221*a* facing the second magnet block 222 or the third magnet block 223 and a first outer surface 221*b* opposite to the second magnet block 222 or the third magnet block 223.

The second magnet block 222 includes a second inner surface 222*a* facing the first magnet block 221 or the third magnet block 223 and a second outer surface 222*b* opposite to the first magnet block 221 or the third magnet block 223.

The third magnet block 223 includes a third inner surface 223*a* facing the space part 215 or the second magnet part 230 and a third outer surface 223*b* opposite to the space part 215 or the second magnet part 230.

The plurality of surfaces of each of the magnet blocks 221, 222 and 223 may be magnetized according to a predetermined rule.

That is, the first inner surface 221*a*, the second inner surface 222*a* and the third inner surface 223*a* are magnetized to the same polarity. In addition, the first outer surface 221*b*, the second outer surface 222*b* and the third outer surface 223*b* are each magnetized to a polarity different from the above polarity.

In this case, the first inner surface 221*a*, the second inner surface 222*a* and the third inner surface 223*a* may be magnetized to the same polarity as the first outer surface 231*b* of the second magnet part 230. That is, the first inner surface 221*a*, the second inner surface 222*a* and the third inner surface 223*a* are magnetized to a polarity different from that of the first inner surface 231*a* of the second magnet part 230.

Likewise, the first outer surface 221*b*, the second outer surface 222*h* and the third outer surface 3*b* are magnetized to the same polarity as the first inner surface 231*a* of the second magnet part 230, That is, the first outer surface 221*b*, the second outer surface 222*b* and the third outer surface 223*b* are magnetized to a polarity different from that of the first outer surface 231*b* of the second magnet part 230.

In the embodiments shown in (a) of FIG. 11 and (a) of FIG. 12, the first inner surface 221*a*, the second inner surface 222*a* and the third inner surface 223*a* are each magnetized to the S pole. In the above embodiment, the first inner surface 231*a* of the second magnet part 230 is magnetized to the N pole different from the above polarity.

In addition, in the embodiments shown in (b) of FIG. 11 and (b) of FIG. 12, the first inner surface 221*a*, the second inner surface 222*a* and the third inner surface 223*a* are each magnetized to the N pole. In the above embodiment, the first inner surface 231*a* of the second magnet part 230 is magnetized to the S pole different from the above polarity.

The second magnet part 230 may form a magnetic field together with other magnetic materials. In the illustrated embodiment, the second magnet part 230 may form a magnetic field together with the first magnet part 220.

The second magnet part 230 may be positioned adjacent to the other one of the third and fourth surfaces 213 and 214. In an embodiment, the second magnet part 230 may be coupled to an inner side (i.e., in a direction toward the space part 215) of the other one of the surfaces.

In the embodiment shown in FIG. 11, the second magnet part 230 is disposed inside the fourth surface 214 and adjacent to the fourth surface 214. In the embodiment shown in FIG. 12, the second magnet part 230 may be disposed inside the third surface 213 and adjacent to the third surface 213.

The second magnet part 230 is disposed to face the first magnet part 220 with the space part 215 interposed therebetween. In the embodiment shown in FIG. 11, the second magnet part 230 is disposed to face the first magnet part 220 located inside the third surface 213. In the embodiment shown in FIG. 12, the second magnet part 230 is disposed to face the first magnet part 220 located inside the fourth surface 214.

The space part 215 and the fixed contact 22 and the movable contact 43 accommodated in the space part 215 are positioned between the second magnet part 230 and the first magnet part 220.

The second magnet part 230 may strengthen the intensity of the magnetic field formed by itself and the magnetic field formed together with the first magnet part 220. Since the direction of the magnetic field formed by the second magnet part 230 and the process of strengthening the magnetic field are well-known techniques, a detailed description thereof will be omitted.

In an embodiment, the second magnet part 230 may be formed to have stronger magnetism than each of the magnet blocks 221, 222 and 223 constituting the first magnet part 220. This is due to the fact that the number of magnet units provided in the second magnet part 230 is smaller than the number of magnet blocks provided in the first magnet part 220.

In an embodiment, the second magnet part 230 may be provided as an Nd magnet (Neodymium Magnet) or an NIB magnet (Neodymium-Iron-Boron Magnet).

In the illustrated embodiment, the second magnet part 230 includes a first magnet unit 231. It will be understood that the magnetic material constituting the second magnet part 230 is named the magnet unit 231.

The first magnet unit 231 may be formed of a magnetic material. In an embodiment, the first magnet unit 231 may be provided as a permanent magnet or an electromagnet or the like.

The first magnet unit 231 may extend in a direction in which the first magnet part 220 extends, that is, in the front and rear direction in the illustrated embodiment, in an embodiment, the first magnet unit 231 may extend by a length longer than each of the magnet blocks 221, 222 and 223.

The first magnet unit 231 may be disposed to overlap each of the fixed contacts 22*a* and 22*b* in a direction toward the third surface 213, that is, in the left and right directions in the illustrated embodiment. In other words, the first magnet unit 231 may be disposed to overlap the fixed contact 22 along the direction in which the first surface 211 or the second surface 212 extends.

The first magnet unit 231 includes a plurality of surfaces. Specifically, the first magnet unit 231 includes a first inner surface 231*a* facing the space part 215 or the first magnet part 220 and a first outer surface 231*b* opposite to the space part 215 or the first magnet part 220.

The plurality of surfaces of the first magnet unit 231 may be magnetized according to a predetermined rule.

The first inner surface 231*a* and the first outer surface 231*b* are magnetized to different polarities. In this case, the first inner surface 231*a* may be magnetized to the same polarity as each of the outer surfaces 221*b*, 222*b* and 223*h* of the first magnet part 220. In other words, the first inner surface 231*a* may be magnetized to a polarity different from that of each of the inner surfaces 221*a*, 222*a* and 223*a* of the first magnet part 220.

Likewise, the first outer surface 231*b* may be magnetized to the same polarity as each of the inner surfaces 221*a*, 222*a* and 223*a* of the first magnet part 220. In other words, the first outer surface 231*b* may be magnetized to a polarity different from that of each of the outer surfaces 221*b*, 222*b* and 223*b* of the first magnet part 220.

In the embodiments shown in (a) of FIG. 11 and (a) of FIG. 12, the first inner surface 231*a* is magnetized to the N pole, in the above embodiment, the first inner surface 221*a*, the second inner surface 222*a* and the third inner surface 223*a* of the first magnet part 220 are each magnetized to the S pole.

In addition, in the embodiments shown in (b) of FIG. 11 and (b) of FIG. 12, the first inner surface 231*a* is magnetized to the S pole. In the above embodiment, the first inner surface 221*a*, the second inner surface 222*a* and the third inner surface 223*a* of the first magnet part 220 are each magnetized to the N pole.

Accordingly, a magnetic field directed from one of the first magnet part 220 and the second magnet part 230 toward the other magnet part is formed in the space part 215.

Hereinafter, the arc path A.P formed by the arc path forming part 200 according to the present embodiment will be described in detail with reference to FIGS. 13 to 16.

Figure 13:
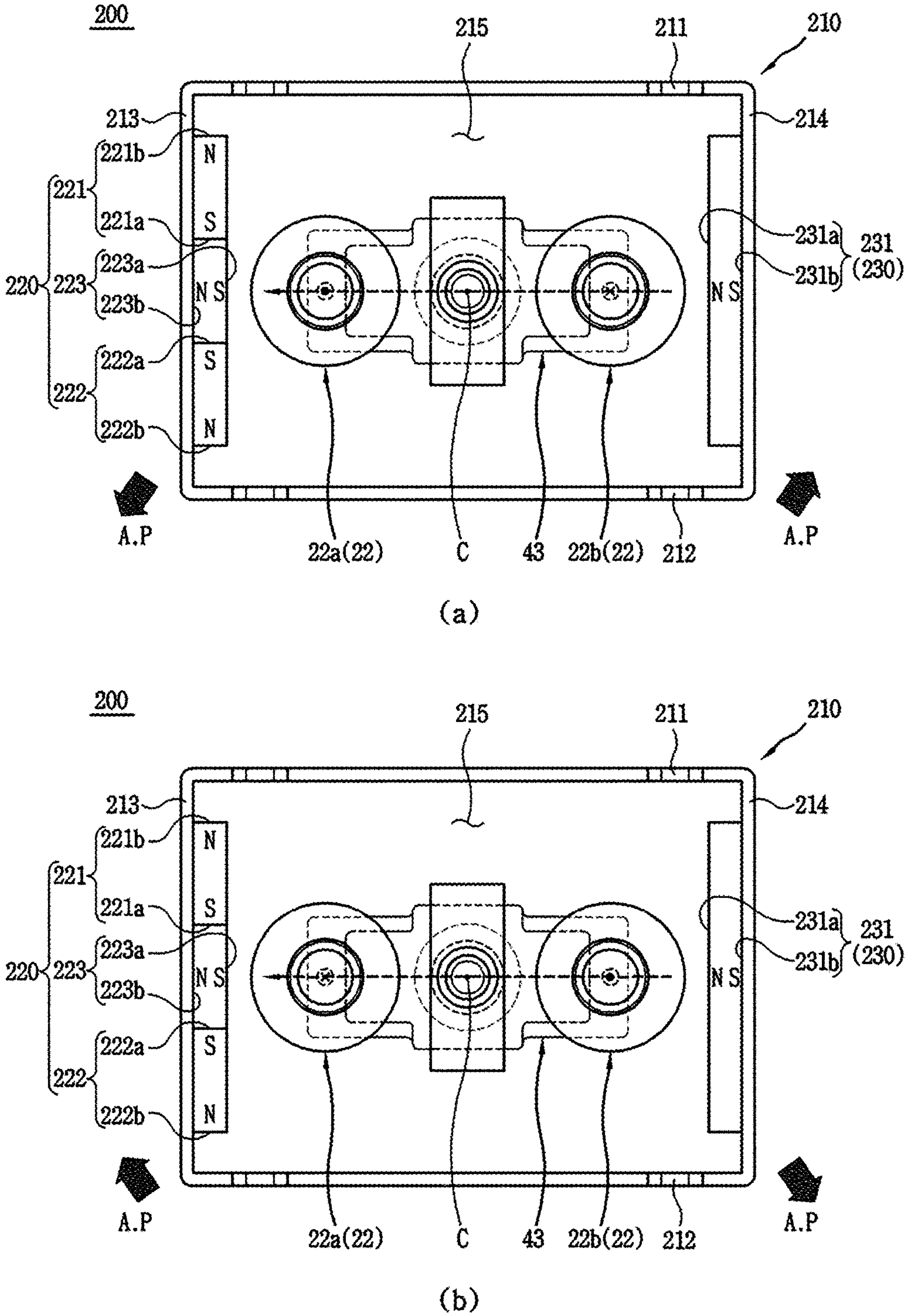
FIGS. 13 to 16 are conceptual views illustrating arc paths formed by the arc path forming part according to the exemplary embodiment of FIGS. 11 and 12.
Figure 15:
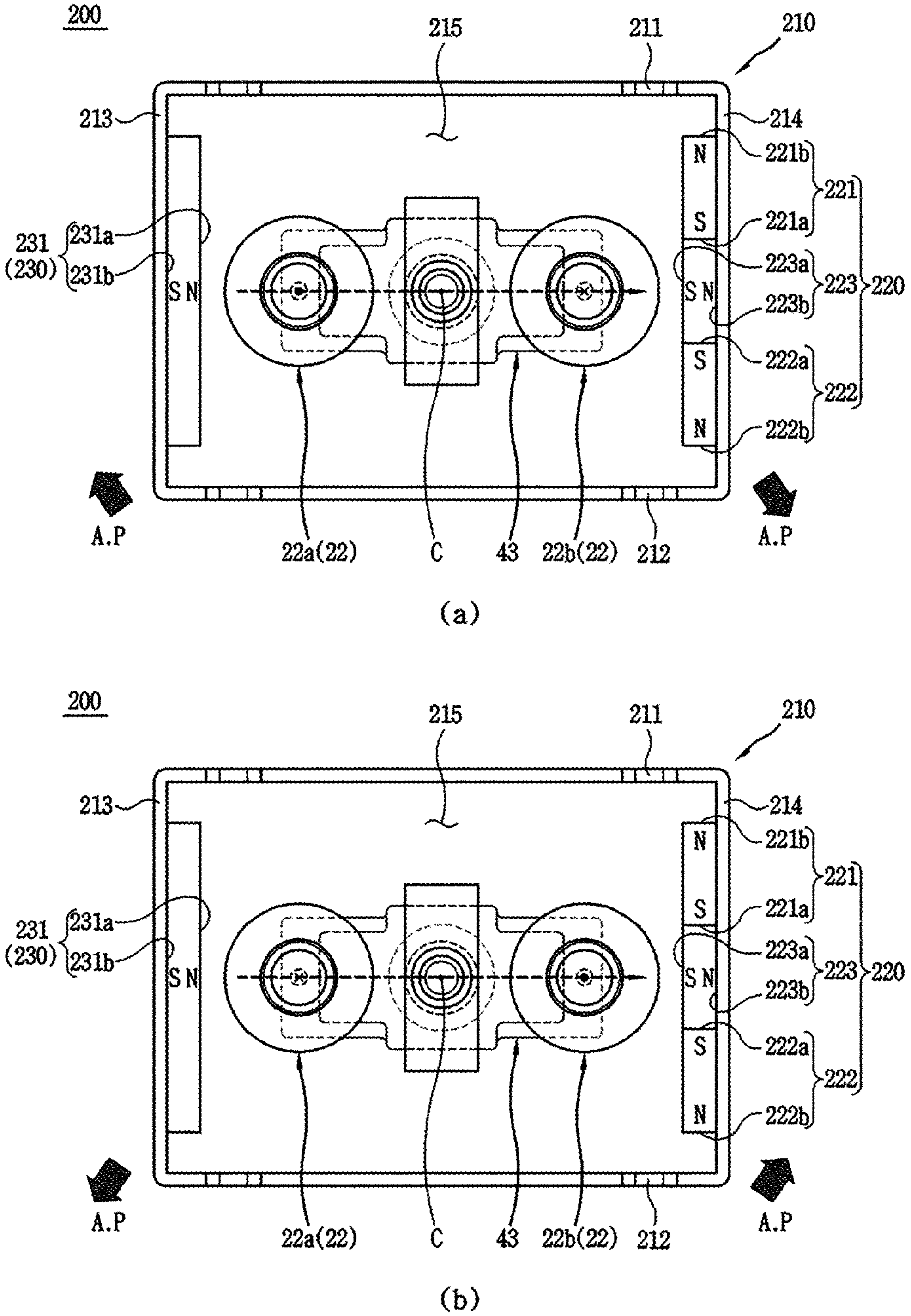

Referring to FIGS. 13 and 15, each of the inner surfaces 221*a*, 222*a* and 223*a* of the first magnet part 220 and the inner surface 231*a* of the second magnet part 230 are magnetized to different polarities.

That is, each of the inner surfaces 221*a*, 222*a* and 223*a* of the first magnet part 220 is magnetized to the S pole, and the inner surface 231*a* of the second magnet part 230 is magnetized to the N pole.

Accordingly, between the second magnet block 222 of the first magnet part 220 and the first magnet unit 231 of the second magnet part 230, a magnetic field is formed in a direction from the first inner surface 231*a* toward the first to third inner surfaces 221*a*. 222*a* and 223*a*.

Figure 14:
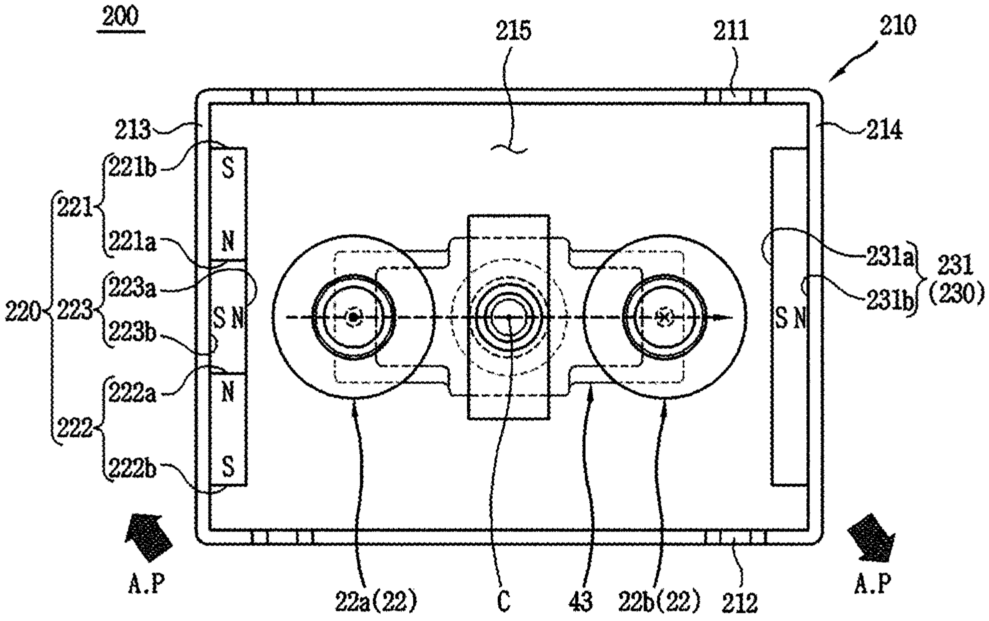
Figure 14:
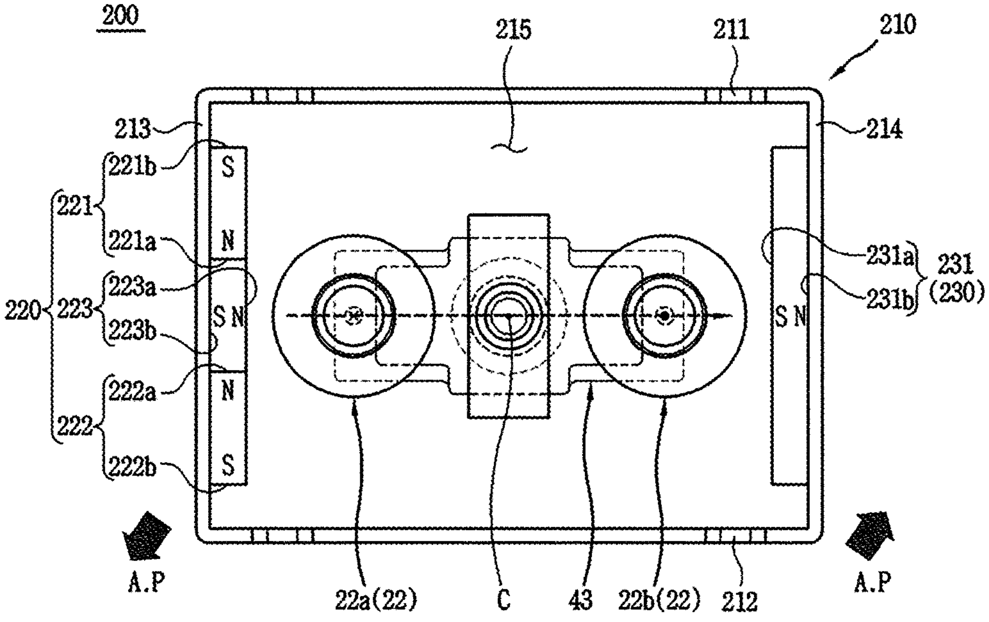
Figure 16:
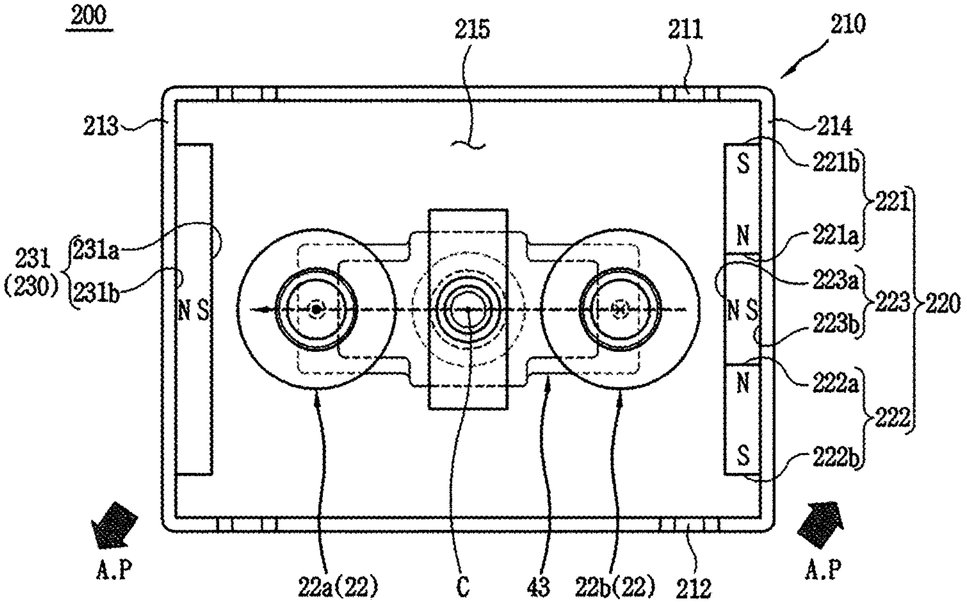
Figure 16:
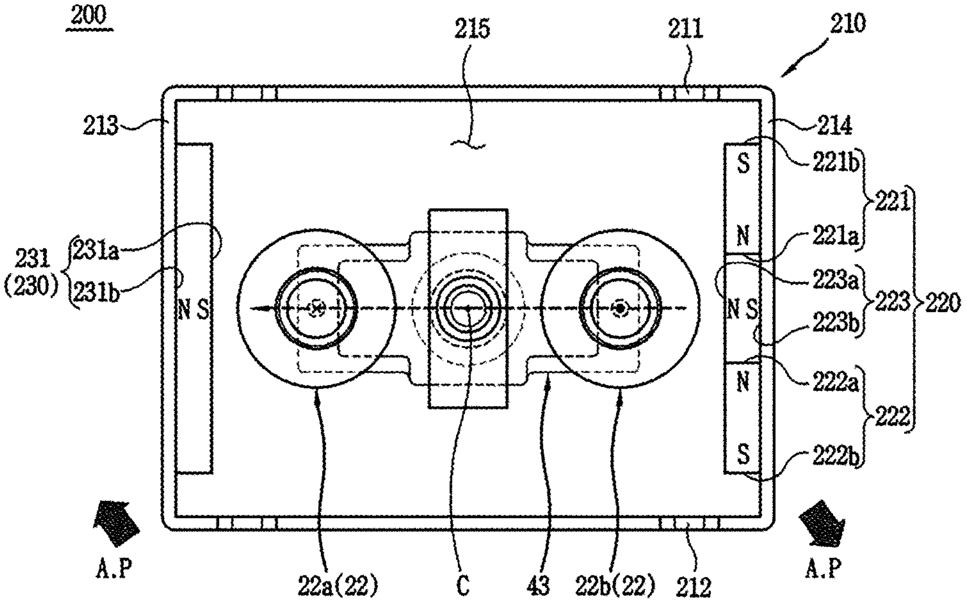

Referring to FIGS. 14 and 16, each of the inner surfaces 221*a*, 222*a* and 223*a* of the first magnet part 220 and the inner surface 231*a* of the second magnet part 230 are magnetized to different polarities.

That is, each of the inner surfaces 221*a*, 222*a* and 223*a* of the first magnet part 220 is magnetized to the N pole, and the inner surface 231*a* of the second magnet part 230 is magnetized to the S pole.

Accordingly, between the second magnet block 222 of the first magnet part 220 and the first magnet unit 231 of the second magnet part 230, a magnetic field is formed in a direction from the first to third inner surfaces 221*a*, 222*a* and 223*a* toward the first inner surface 231*a*.

In the embodiments shown in FIG. 13(*a*), FIG. 14(*a*), FIG. 15(*a*) and FIG. 16(*a*) the direction of the electric current is the direction from the second fixed contact 22*b* through the movable contact 43 to the first fixed contact 22*a*.

When Fleming's rule is applied to the first fixed contact 22*a*, the direction of the electromagnetic force generated near the first fixed contact 22*a* and the arc path A.P. may be known.

That is, in the embodiments shown in FIG. 13(*a*) and FIG. 16(*a*), the electromagnetic force and the arc path A.P. near the first fixed contact 22*a* are formed toward the front left side.

In addition, in the embodiments shown in FIG. 14(*a*) and FIG. 15(*a*), the electromagnetic force and the arc path A.P. near the first fixed contact 22*a* are formed toward the rear left side.

Likewise, when Fleming's rule is applied to the second fixed contact 22*b*, the direction of the electromagnetic force generated near the second fixed contact 22*h* and the arc path A.P. may be known.

That is, in the embodiments shown in FIG. 13(*a*) and FIG. 16(*a*), the electromagnetic force and the arc path A.P. near the second fixed contact 22*b* are formed toward the rear right side.

In addition, in the embodiments shown in FIG. 14(*a*) and FIG. 15(*a*), the electromagnetic force and the arc path A.P. near the second fixed contact 22*b* are formed toward the front right side.

In the embodiments shown in FIG. 13(*b*), FIG. 14(*b*), FIG. 15(*b*) and FIG. 16(*b*), the direction of the electric current is the direction from the first fixed contact 22*a* through the movable contact 43 to the second fixed contact 22*b*.

When Fleming's rule is applied to the first fixed contact 22*a*, the direction of the electromagnetic force generated near the first fixed contact 22*a* and the arc path A.P. may be known.

That is, in the embodiments shown in FIG. 13(*b*) and FIG. 16(*b*), the electromagnetic force and the arc path A.P. near the first fixed contact 22*a* are formed toward the rear left side.

In addition, in the embodiments shown in FIG. 14(*b*) and FIG. 15(*b*), the electromagnetic force and the arc path A.P. near the first fixed contact 22*a* are formed toward the front left side.

Likewise, when Fleming's rule is applied to the second fixed contact 22*h*, the direction of the electromagnetic force generated near the second fixed contact 22*h* and the arc path A.P. may be known.

That is, in the embodiments shown in FIG. 13(*b*) and FIG. 16(*h*), the electromagnetic force and the arc path A.P. near the second fixed contact 22*b* are formed toward the front right side.

In addition, in the embodiments shown in FIG. 14(*b*) and FIG. 15(*b*), the electromagnetic force and the arc path A.P. near the second fixed contact 22*b* are formed toward the rear right side.

Therefore, the arc path forming part 200 according to the present embodiment may form the electromagnetic force and the arc path A.P in a direction away from the central portion C, regardless of the polarity of the first and second magnet parts 220 and 230 or the direction f the electric current energizing through the direct current relay 1.

Moreover, each arc path A.P formed near each of the fixed contacts 22*a* and 22*b* is formed in a direction away from each other.

Accordingly, damage to each component of the direct current relay 1 disposed adjacent to the central portion C can be prevented. Furthermore, the generated arc can be quickly discharged to the outside, so that the operation reliability of the direct current relay 1 can be improved.

(3) Description of Arc Path Forming Part 300 According to Vet Another Embodiment of the Present Disclosure Hereinafter, the arc path forming part 300 according to yet another embodiment of the present disclosure will be described in detail with reference to FIGS. 17 to 22.

Figure 17:
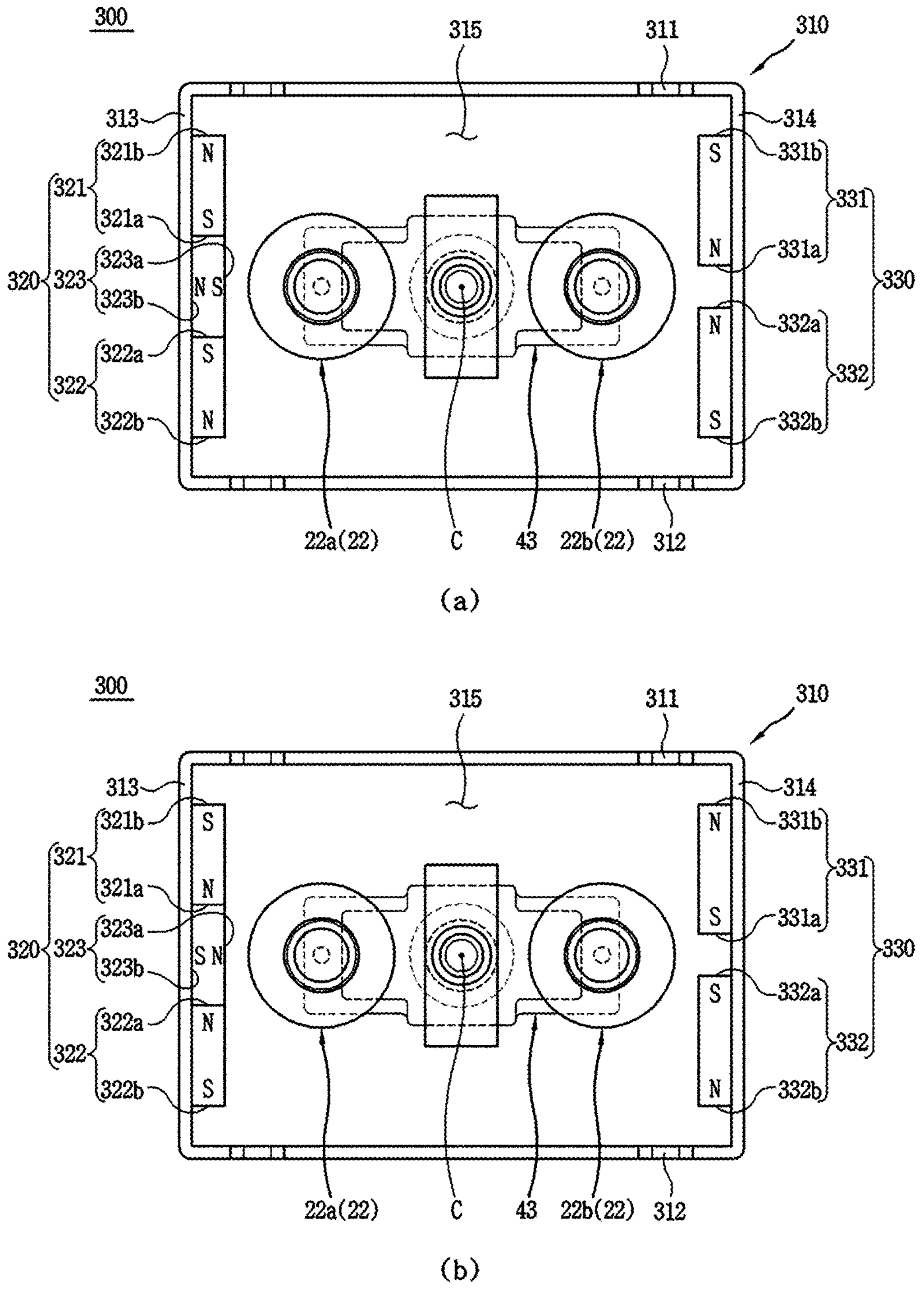
FIGS. 17 and 18 are plan views illustrating an arc path forming part according to yet another exemplary embodiment of the present disclosure.
Figure 18:
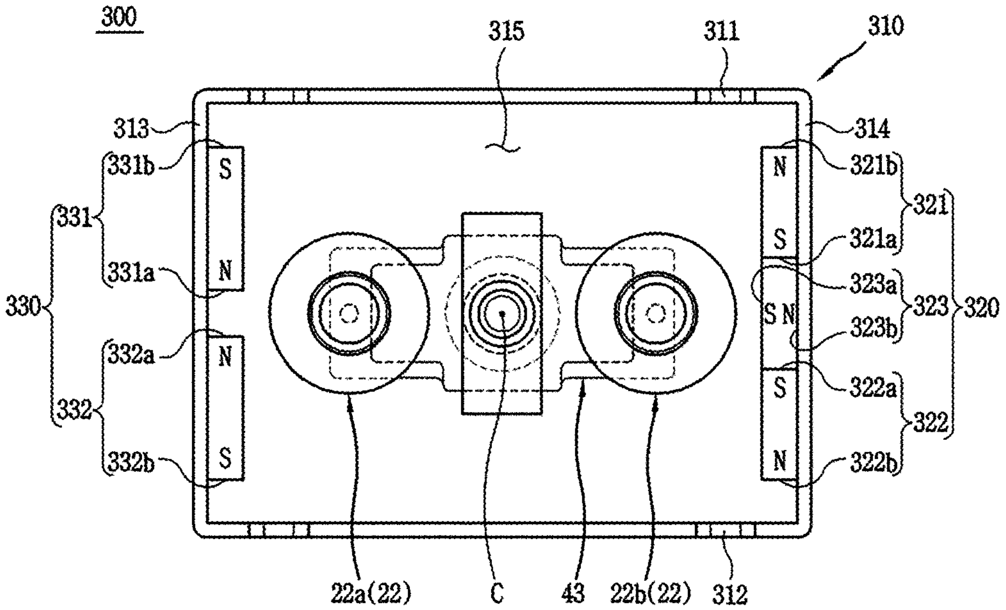
Figure 18:
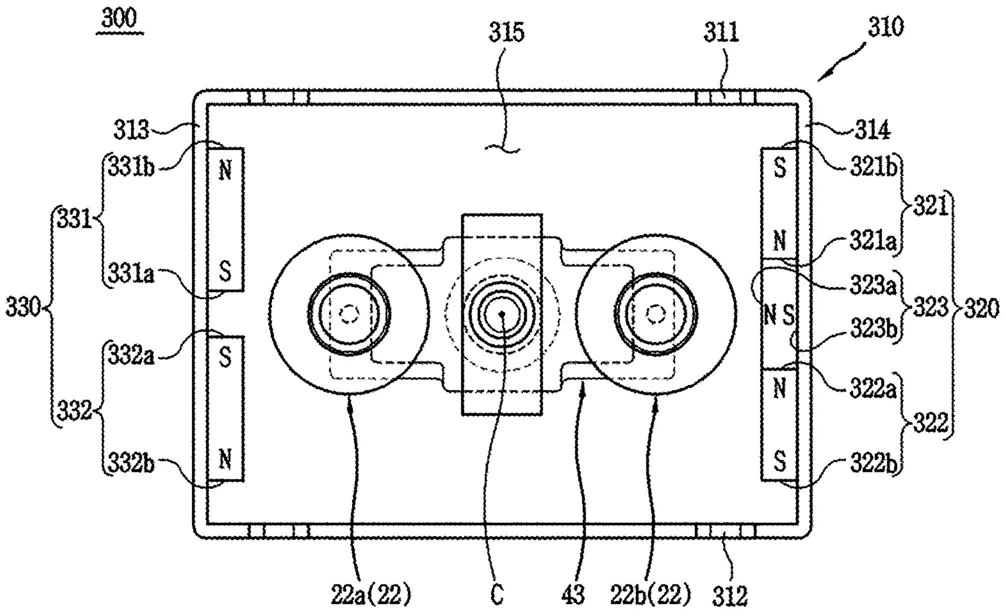

Referring to FIGS. 17 and 18, the arc path forming part 300 according to the illustrated embodiment includes a magnet frame 310, a first magnet part 320 and a second magnet part 330.

The magnet frame 310 according to the present embodiment has the same structure and function as the magnet frames 110 and 210 according to the above-described. embodiments. However, the first magnet part 320 and the second magnet part 330 disposed on the magnet frame 310 according to the present embodiment are different from the arc path forming parts 100 and 200 according to the above-described embodiments.

Therefore, the description of the magnet frame 310 will be replaced with the descriptions of the magnet frames 110 and 210 according to the above-described embodiments.

The first magnet part 320 may form a magnetic field together with other magnetic materials. In the illustrated embodiment, the first magnet part 320 may form a magnetic field together with the second magnet part 330.

The first magnet part 320 may be positioned adjacent to one of the third and fourth surfaces 313 and 314. In an embodiment, the first magnet part 320 may be coupled to an inner side (i.e., in a direction toward the space part 315) of any one of the surfaces.

In the embodiment shown in FIG. 17, the first magnet part 320 is disposed inside the third surface 313 and adjacent to the third surface 313. In the embodiment shown in FIG. 18, the first magnet part 320 may be disposed inside the fourth surface 314 and adjacent to the fourth surface 314.

The first magnet part 320 is disposed to face the second magnet part 330, In the embodiment show n in FIG. 17, the first magnet part 320 is disposed to face the second magnet part 330 located inside the fourth surface 314. In the embodiment shown in FIG. 18, the first magnet part 320 is disposed to face the second magnet part 330 located inside the third surface 313.

The space part 315 and the fixed contact 22 and the movable contact 43 accommodated in the space part 315 are positioned between the first magnet part 320 and the second magnet part 330.

The first magnet part 320 may strengthen the intensity of the magnetic field formed by itself and the magnetic field formed together with the second magnet part 330. Since the direction of the magnetic field formed by the first magnet part 320 and the process of strengthening the magnetic field are well-known techniques, a detailed description thereof will be omitted.

In the illustrated embodiment, a plurality of magnetic materials constituting the first magnet part 320 are arranged side by side from the front side to the rear side. In addition, the plurality of magnetic materials constituting the first magnet part 320 extend in the front-rear direction.

That is, the plurality of magnetic materials constituting the first magnet part 320 are arranged side by side in the extension direction.

In the illustrated embodiment, the first magnet part 320 includes a first magnet block 321, a second magnet block 322 and a third magnet block 323. It will be understood that the plurality of magnetic materials constituting the first magnet part 320 are named magnet blocks 321, 322 and 323, respectively.

The first to third magnet blocks 321, 322 and 323 may be formed of a magnetic material. In an embodiment, the first to third magnet blocks 321, 322 and 323 may be provided as permanent magnets or electromagnets or the like.

The first to third magnet blocks 321, 322 and 323 may be arranged side by side in one direction. In the illustrated embodiment, the first to third magnet blocks 321, 322 and 323 are disposed side by side in a direction in which the third surface 313 extends, that is, in the front and rear direction.

Among the first to third magnet blocks 321, 322 and 323, the first magnet block 321 is disposed on the rear side and the second magnet block 322 is disposed on the front side. Also, the third magnet block 323 is located between the first magnet block 321 and the second magnet block 322.

In the above embodiment, the third magnet block 323 may overlap the fixed contact 22 along the left-right direction, that is, along the direction in which the first surface 311 or the second surface 312 extends.

In the above embodiment, the first to third magnet blocks 321, 322 and 323 may be in contact with each other. That is, the third magnet block 323 may be in contact with the first magnet block 321 and the second magnet block 322, respectively.

In the above embodiment, it will be understood that the first magnet part 320 may function as a Halbach array.

The first to third magnet blocks 321, 322 and 323 include a plurality of surfaces, respectively.

Specifically, the first magnet block 321 includes a first inner surface 321*a* facing the second magnet block 322 or the third magnet block 323 and a first outer surface 321*b* opposite to the second magnet block 322 or the third magnet block 323.

The second magnet block 322 includes a second inner surface 322*a* facing the first magnet block 321 or the third magnet block 323 and a second outer surface 322*b* opposite to the first magnet block 321 or the third magnet block 323.

The third magnet block 323 includes a third inner surface 323*a* facing the space part 315 or the second magnet part 330 and a third outer surface 323*b* opposite to the space part 315 or the second magnet part 330.

The plurality of surfaces of each of the magnet blocks 321, 322 and 323 may be magnetized according to a predetermined rule.

That is, the first inner surface 321*a*, the second inner surface 322*a* and the third inner surface 323*a* are magnetized to the same polarity. In addition, the first outer surface 321*b*, the second outer surface 322*b* and the third outer surface 323*b* are each magnetized to a polarity different from the above polarity.

In this case, the first inner surface 321*a*, the second inner surface 322*a* and the third inner surface 323*a* may be magnetized to the same polarity as the first and second outer surfaces 331*b* and 332*b* of the second magnet part 330. That is, the first inner surface 321*a*, the second inner surface 322*a* and the third inner surface 323*a* are magnetized to a polarity different from that of the first and second inner surfaces 331*a* and 332*a* of the second magnet part 330.

Likewise, the first outer surface 321*b*, the second outer surface 322*b* and the third outer surface 323*b* are magnetized to the same polarity as the first and second inner surfaces 331*a* and 332*a* of the second magnet part 330. That is, the first outer surface 321*b*, the second outer surface 322*b* and the third outer surface 323*b* are magnetized to a polarity different from that of the first and second outer surfaces 331*b* and 332*h* of the second magnet part 330.

In the embodiments shown in (a) of FIG. 17 and (a) of FIG. 18, the first inner surface 321*a*, the second inner surface 322*a* and the third inner surface 323*a* are each magnetized to the S pole. In the above embodiment, the first inner surface 331*a* and the second inner surface 332*a* of the second magnet part 330 are each magnetized to the N pole different from the above polarity.

In addition, in the embodiments shown in (b) of FIG. 17 and (b) of FIG. 18, the first inner surface 321*a*, the second inner surface 322*a* and the third inner surface 323*a* are each magnetized to the N pole. In the above embodiment, the first inner surface 331*a* and the second inner surface 332*a* of the second magnet part 330 are magnetized to the S pole different from the above polarity.

The second magnet part 330 may form a magnetic field together with other magnetic materials. In the illustrated embodiment, the second magnet part 330 may form a magnetic field together with the first magnet part 320.

The second magnet part 330 may be positioned adjacent to the other one of the third and fourth surfaces 313 and 314. In an embodiment, the second magnet part 330 may be coupled to an inner side (i.e., in a direction toward the space part 315) of the other one of the surfaces.

In the embodiment shown in FIG. 17, the second magnet part 330 is disposed inside the fourth surface 314 and adjacent to the fourth surface 314. In the embodiment shown in FIG. 18, the second magnet part 330 may be disposed inside the third surface 313 and adjacent to the third surface 313.

The second magnet part 330 is disposed to face the first magnet part 320 with the space part 315 interposed therebetween. In the embodiment shown in FIG. 17, the second magnet part 330 is disposed to face the first magnet part 320 located inside the third surface 313. In the embodiment shown in FIG. 18, the second magnet part 330 is disposed to face the first magnet part 320 located inside the fourth surface 314.

The space part 315 and the fixed contact 22 and the movable contact 43 accommodated in the space part 315 are positioned between the second magnet part 330 and the first magnet part 320.

The second magnet part 330 may strengthen the intensity of the magnetic field formed by itself and the magnetic field formed together with the first magnet part 320. Since the direction of the magnetic field formed by the second magnet part 330 and the process of strengthening the magnetic field are well-known techniques, a detailed description thereof will be omitted.

In an embodiment, the second magnet part 330 may be formed to have stronger magnetism than each of the magnet blocks 321, 322 and 323 constituting the first magnet part 320. This is due to the fact that the number of magnet units provided in the second magnet part 330 is smaller than the number of magnet blocks provided in the first magnet part 320.

In an embodiment, the second magnet part 330 may be provided as an Nd magnet (Neodymium Magnet) or an NIB magnet (Neodymium-Iron-Boron Magnet).

In the illustrated embodiment, the second magnet part 330 includes a first magnet unit 331 and a second magnet unit 332. It will be understood that the magnetic material constituting the second magnet part 330 is named the magnet units 331 and 332, respectively.

The first magnet unit 331 may be formed of a magnetic material. In an embodiment, the first magnet unit 331 may be provided as a permanent magnet or an electromagnet or the like.

The first magnet unit 331 may extend in a direction in which the first magnet part 320 extends, that is, in the front and rear direction in the illustrated embodiment. In an embodiment, the first magnet unit 331 may extend by a length longer than each of the magnet blocks 321, 322 and 323.

The first magnet unit 331 may be positioned to be biased to one of the first surface 311 and the second surface 312. In the illustrated embodiment, the first magnet unit 331 is positioned to be biased to the first surface 311 positioned at the rear side. That is, in the above embodiment, the first magnet unit 331 is positioned to be biased to the rear side.

The second magnet unit 332 is positioned adjacent to the first magnet unit 331. In the illustrated embodiment, the first magnet unit 331 and the second magnet unit 332 are positioned to be spaced apart from each other along its extending direction, that is, in the front-rear direction.

The second magnet unit 332 may be formed of a magnetic material. In an embodiment, the second magnet unit 332 may be provided as a permanent magnet or an electromagnet or the like.

The second magnet unit 332 may extend in a direction in which the first magnet part 320 extends, that is, in the front-rear direction in the illustrated embodiment. In an embodiment, the second magnet unit 332 may extend by a length longer than each of the magnet blocks 321, 322 and 323.

The second magnet unit 332 may be positioned to be biased to the other one of the first surface 311 and the second surface 312. In the illustrated embodiment, the second magnet unit 332 is positioned to be biased to the second surface 312 positioned at the front side. That is, in the above embodiment, the second magnet unit 332 is positioned to be biased to the front side.

The second magnet unit 332 is positioned adjacent to the first magnet unit 331. In the illustrated embodiment, the second magnet unit 332 is positioned to be spaced apart from the first magnet unit 331 along its extending direction, that is, in the front-rear direction.

In an embodiment not shown, the first magnet unit 331 and the second magnet unit 332 may be in contact with each other. In the above embodiment, it will be understood that the second magnet part 330 may function as a Halbach array.

Each of the first magnet unit 331 and the second magnet unit 332 includes a plurality of surfaces.

Specifically, the first magnet unit 331 includes a first inner surface **331*a* facing the second magnet unit 332 and a first outer surface 331*b* opposite to the second magnet unit 332**.

Likewise, the second magnet unit 332 includes a second inner surface **332*a* facing the first magnet unit 331 and a second outer surface 332*b* opposite to the first magnet unit 331**.

The plurality of surfaces of the first magnet unit 331 and the second magnet unit 332 may be magnetized according to a predetermined rule.

The first inner surface **331*a* and the second inner surface 332*a* are magnetized to the same polarity. In addition, the first outer surface 331*b* and the second outer surface 332*h*** are each magnetized to a polarity different from the above polarity.

In this case, the first inner surface **331*a* and the second inner surface 332*a* are magnetized to the same polarity as each of the outer surfaces 321*h*, 322*b* and 323*h* of the first magnet part 320. In other words, the first inner surface 332*a* and the second inner surface 332*a* may be magnetized to a polarity different from that of each of the inner surfaces 321*a*, 322*a* and 323*a* of the first magnet part 320**.

Likewise, the first outer surface **331*b* and the second outer surface 332*b* are magnetized to the same polarity as each of the inner surfaces 321*a*, 322*a* and 323*a* of the first magnet part 320. In other words, the first outer surface 331*h* and the second outer surface 332*b* may be magnetized to a polarity different from that of each of the outer surfaces 321*b*, 322*b* and 323*b* of the first magnet part 320**.

In the embodiments shown in (a) of FIG. 17 and (a) of FIG. 18, the first inner surface **331*a* and the second inner surface 332*a* are each magnetized to the N pole. In the above embodiment, the first inner surface 321*a*, the second inner surface 322*a* and the third inner surface 323*a* of the first magnet part 320** are each magnetized to the S pole.

In addition, in the embodiments shown in (b) of FIG. 17 and (b) of FIG. 18, the first inner surface **331*a* and the second inner surface 332*a* are each magnetized to the S pole. In the above embodiment, the first inner surface 321*a*, the second inner surface 322*a* and the third inner surface 323*a* of the first magnet part 320** are each magnetized to the N pole.

Accordingly, a magnetic field directed from one of the first magnet part 320 and the second magnet part 330 toward the other magnet part is formed in the space part 315.

Hereinafter, the arc path A.P formed by the arc path forming part 300 according to the present embodiment will be described in detail with reference to FIGS. 19 to 22.

Figure 19:
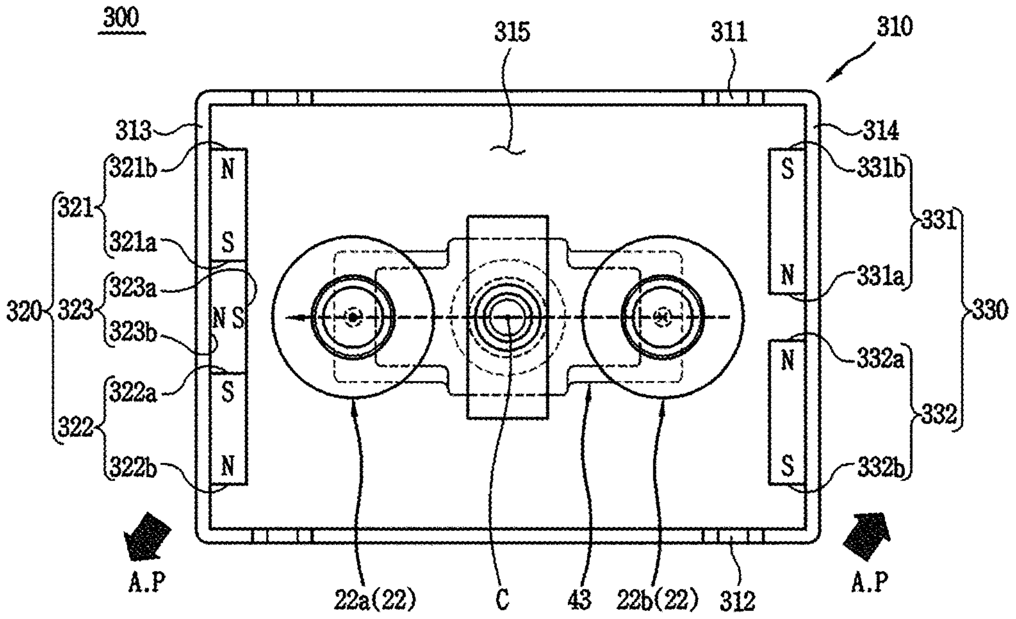
FIGS. 19 to 22 are conceptual views illustrating arc paths formed by the arc path forming part according to the exemplary embodiment of FIGS. 17 and 18.
Figure 19:
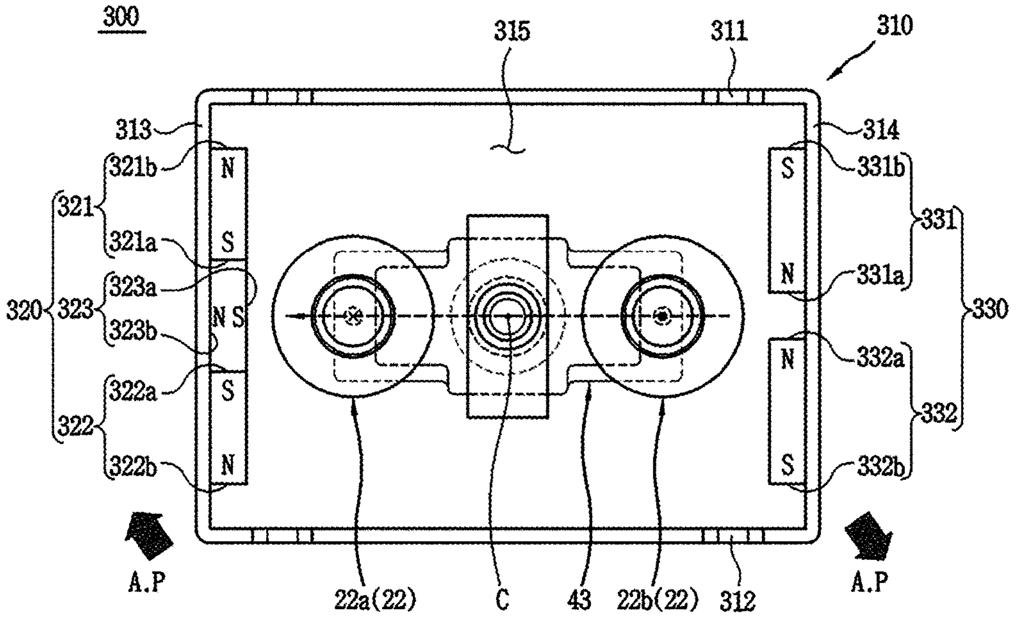
Figure 21:
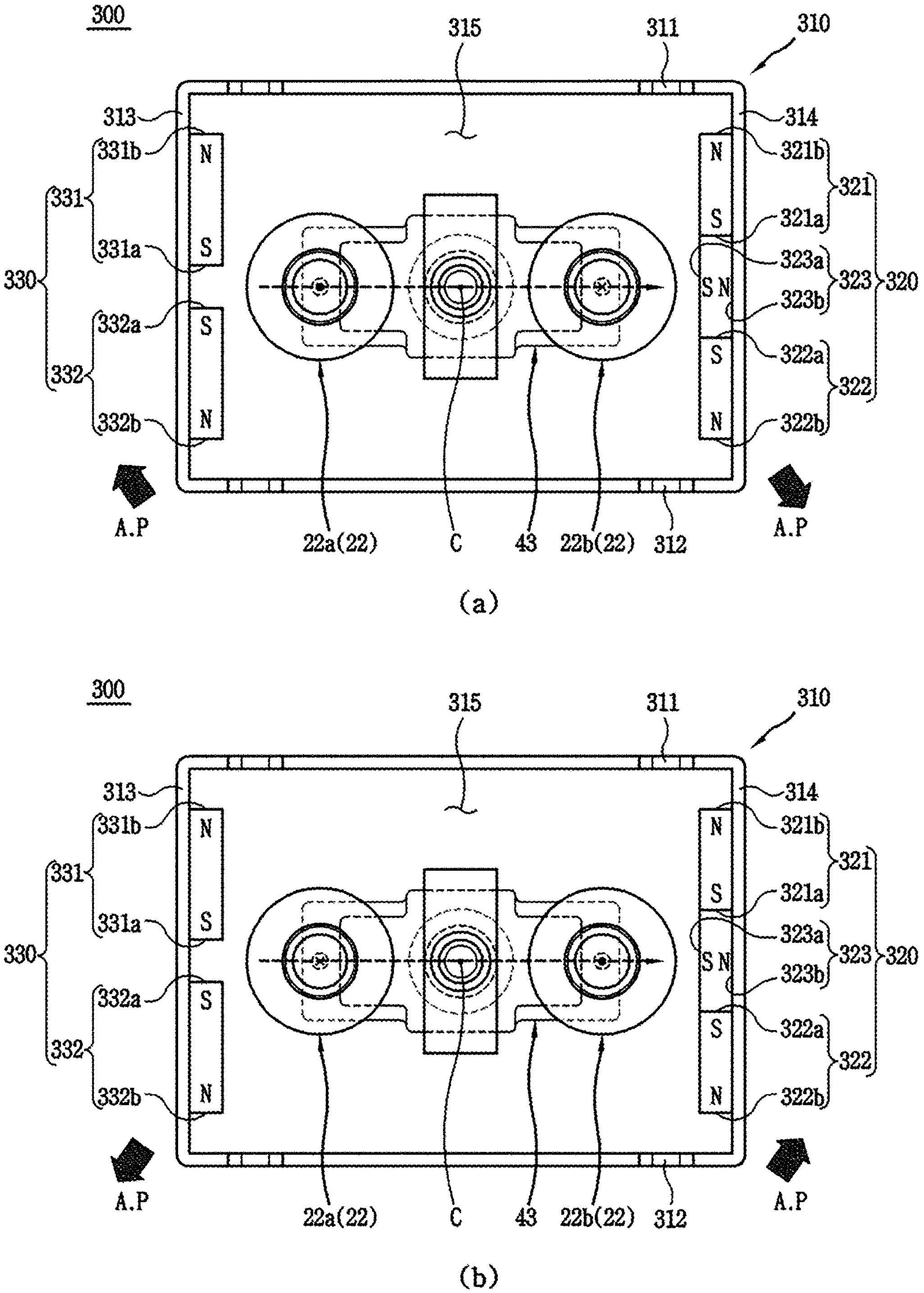

Referring to FIGS. 19 and 21, each of the inner surfaces **321*a*, 322*a* and 323*a* of the first magnet part 320 and each of the inner surfaces 331***a* and 332*a* of the second magnet part 330 are magnetized to different polarities.

That is, each of the inner surfaces 321*a*, 322*a* and 323*a* of the first magnet part 320 is magnetized to the S pole, and each of the inner surfaces 331*a* and 332*a* of the second magnet part 330 is magnetized to the N pole.

Accordingly, between the second magnet block 322 of the first magnet part 320 and the first magnet unit 331 of the second magnet part 330, a magnetic field is formed in a direction from the first and second inner surfaces 331*a* and 332*a* toward the first to third inner surfaces 321*a*, 322*a* and 323*a*.

Figure 20:
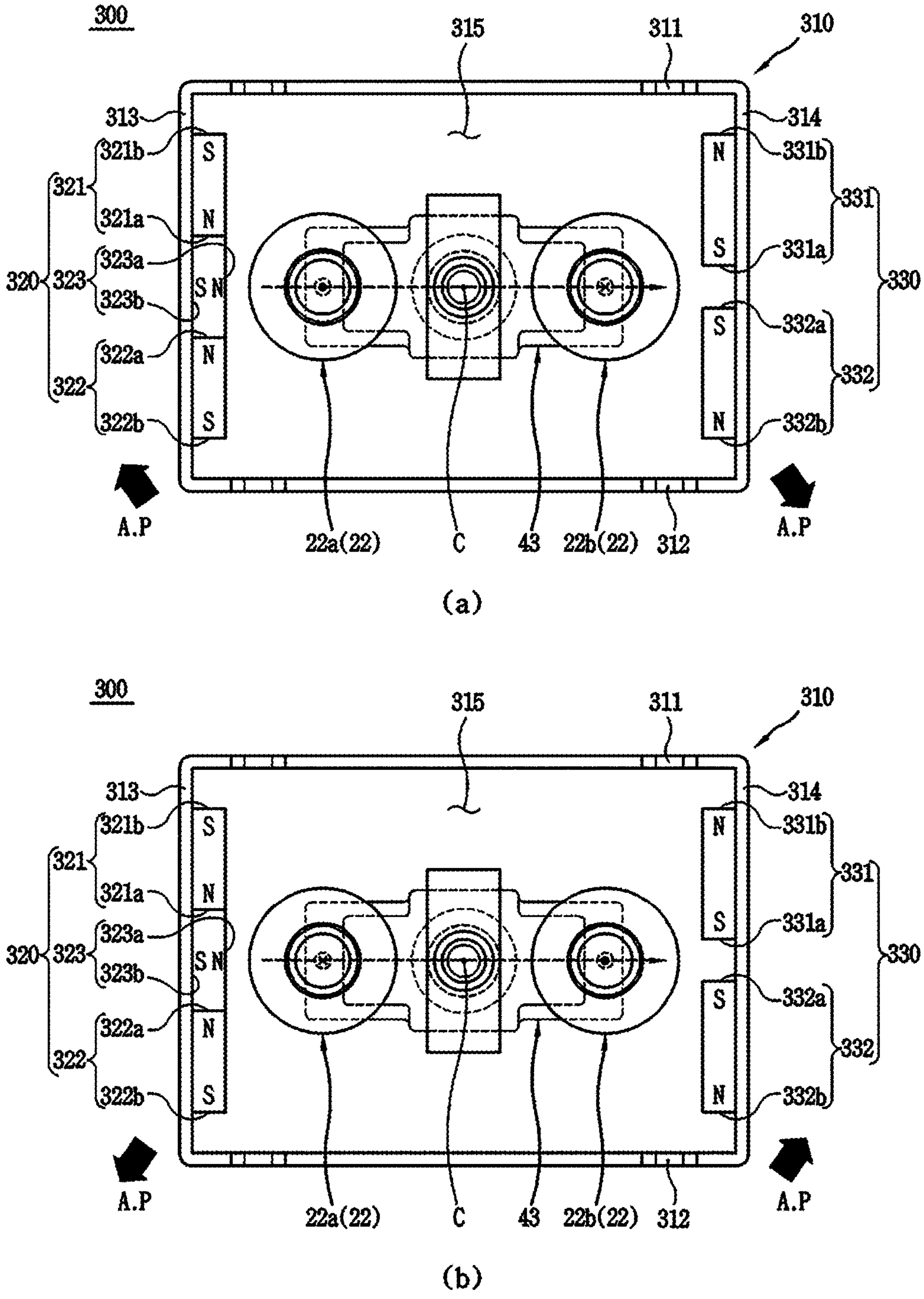
Figure 22:
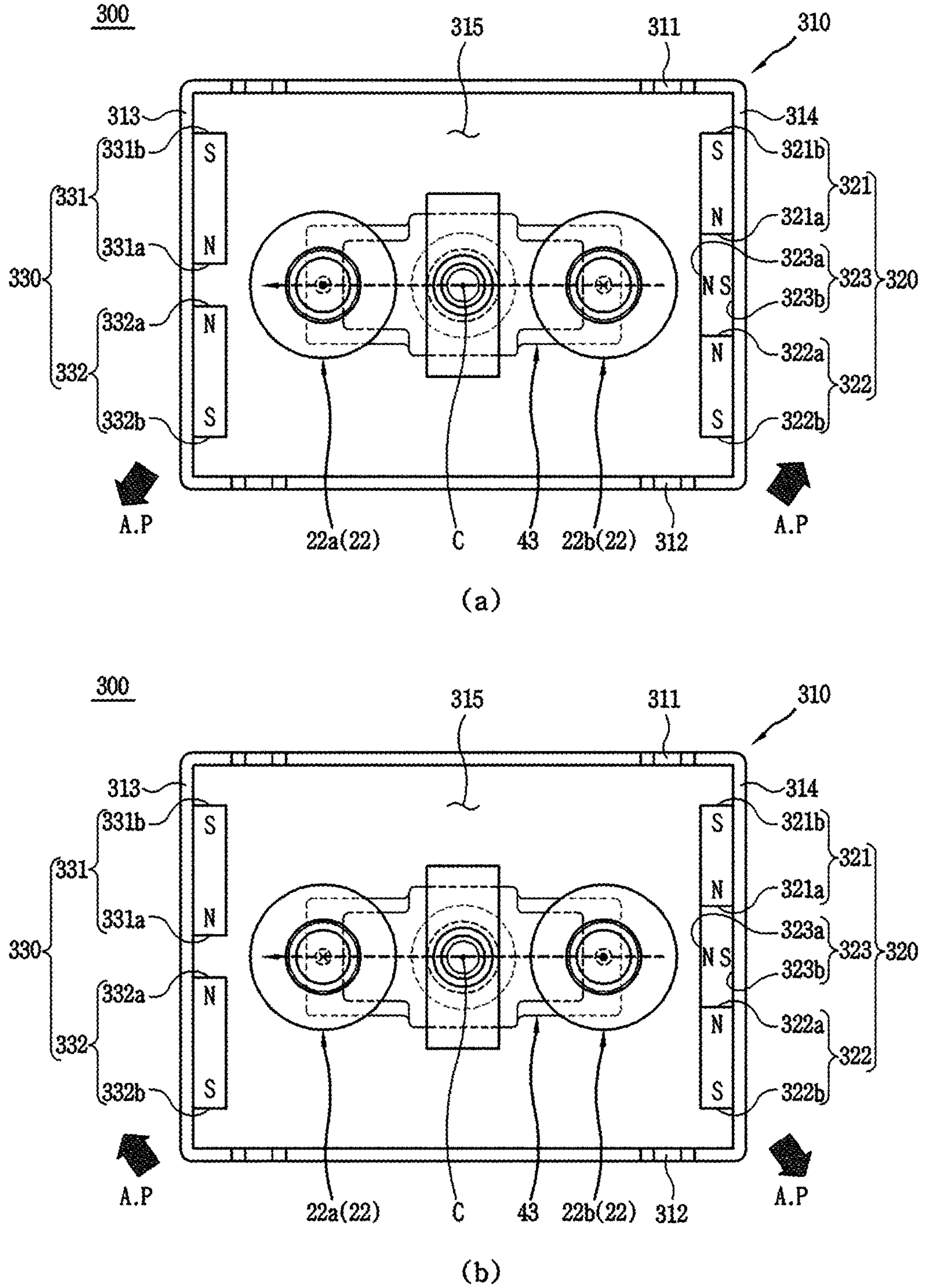

Referring to FIGS. 20 and 22, each of the inner surfaces 321*a*, 322*a* and 323*a* of the first magnet part 320 and each of the inner surfaces 331*a* and 332*a* of the second magnet part 330 are magnetized to different polarities.

That is, each of the inner surfaces 321*a*, 322*a* and 323*a* of the first magnet part 320 is magnetized to the N pole, and each of the inner surfaces 331*a* and 332*a* of the second magnet part 330 is magnetized to the S pole.

Accordingly, between the second magnet block 322 of the first magnet part 320 and the first magnet unit 331 of the second magnet part 330, a magnetic field is formed in a direction from the first to third inner surfaces 321*a*, 322*a* and 323*a* toward the first and second inner surfaces 331*a* and 332*a*.

In the embodiments shown in FIG. 19(*a*), FIG. 20(*a*), FIG. 21(*a*) and FIG. 22(*a*), the direction of the electric current is the direction from the second fixed contact 22*h* through the movable contact 43 to the first fixed contact 22*a*.

When Fleming's rule is applied to the first fixed contact 22*a*, the direction of the electromagnetic force generated near the first fixed contact 22*a* and the arc path A.P. may be known.

That is, in the embodiments shown in FIG. 19(*a*) and FIG. a), the electromagnetic force and the arc path A.P. near the first fixed contact 22*a* are formed toward the front left side.

In addition, in the embodiments shown in FIG. 20(*a*) and FIG. 21(*a*), the electromagnetic force and the arc path A.P. near the first fixed contact 22*a* are formed toward the rear left side.

Likewise, when Fleming's rule is applied to the second fixed contact 22*b*, the direction of the electromagnetic force generated near the second fixed contact 22*b* and the arc path A.P. may be known.

That is, in the embodiments shown in FIG. 19(*a*) and FIG. 22(*a*), the electromagnetic force and the arc path A.P, near the second fixed contact 22*b* are formed toward the rear right side.

In addition, in the embodiments shown in FIG. 20(*a*) and FIG. 21(*a*), the electromagnetic force and the arc path A.P. near the second fixed contact 22*b* are formed toward the front right side.

In the embodiments shown in FIG. 19(*b*), FIG. 20(*b*), FIG. 21(*b*) and FIG. 22(*b*), the direction of the electric current is the direction from the first fixed contact 22*a* through the movable contact 43 to the second fixed contact 22*b*.

When Fleming's rule is applied to the first fixed contact 22*a*, the direction of the electromagnetic force generated near the first fixed contact 22*a* and the arc path A.P. may be known.

That is, in the embodiments shown in FIG. 19(*b*) and FIG. 22(*b*), the electromagnetic force and the arc path A.P. near the first fixed contact 22*a* are formed toward the rear left side.

In addition, in the embodiments shown in FIG. 20(*b*) and FIG. 21(*b*), the electromagnetic force and the arc path A.P. near the first fixed contact 22*a* are formed toward the front left side.

Likewise, when Fleming's rule is applied to the second fixed contact 22*h*, the direction of the electromagnetic force generated near the second fixed contact 22*h* and the arc path A.P. may be known.

That is, in the embodiments shown in FIG. 19(*b*) and FIG. 22(*h*), the electromagnetic force and the arc path A.P. near the second fixed contact 22*b* are formed toward the front right side.

In addition, in the embodiments shown in FIG. 20(*b*) and FIG. 21(*h*), the electromagnetic force and the arc path A.P near the second fixed contact 22*b* are formed toward the rear right side.

Therefore, the arc path forming part 300 according to the present embodiment may form the electromagnetic force and the arc path A.P in a direction away from the central portion 3C, regardless of the polarity of the first and second magnet parts 320 and 330 or the direction of the electric current energizing through the direct current relay 1.

Moreover, each arc path A.P formed near each of the fixed contacts 22*a* and 22*b* is formed in a direction away from each other.

Accordingly, damage to each component of the direct current relay 1 disposed adjacent to the central portion 3C can be prevented. Furthermore, the generated arc can be quickly discharged to the outside, so that the operation reliability of the direct current relay 1 can be improved.

Although the above has been described with reference to preferred embodiments of the present disclosure, it will be understood that those skilled in the art can variously modify and change the present disclosure without departing from the spirit and scope of the present disclosure described in the claims below.

1: direct current relay
10: frame part
11: upper frame
12: lower frame
13: insulating plate
14: support plate
20: switch part
21: arc chamber
22: fixed contact
22*a*: first fixed contact
22*b*: second fixed contact
23: sealing member
30: core part
31: stationary core
32: movable core
33: yoke
34: bobbin
35: coil
36: return spring
37: cylinder
40: movable contact part
41: housing
42: cover
43: movable contact
44: shaft
45: elastic part
100: arc path forming part according to an embodiment of the present disclosure
110: magnet frame
111: first surface
112: second surface

113: third surface
114: fourth surface
115: space part
120: first magnet part
121: first magnet block
121*a*: first inner surface
121*b*: first outer surface
122: second magnet block
122*a*: second inner surface
122*b*: second outer surface
130: second magnet part
131: first magnet unit
131*a*: first inner surface
[54 131*b*: first outer surface
200: arc path forming part according to another embodiment of the present disclosure
210: magnet frame
211: first surface
212: second surface
213: third surface
214: fourth surface
215: space part
220: first magnet part
221: first magnet block
221*a*: first inner surface
221*b*: first outer surface
222: second magnet block
222*a*: second inner surface
222*b*: second outer surface
773: third magnet block
223*a*: third inner surface
223*b*: third outer surface
230: second magnet part
231: first magnet unit
231*a*: first inner surface
231*b*: first outer surface
300: arc path forming part according to yet another embodiment of the present disclosure
310: magnet frame
311: first surface
312: second surface
313: third surface
314: fourth surface
315: space part
320: first magnet part
321: first magnet block
321*a*: first inner surface
321*b*: first outer surface
322: second magnet block
322*a*: second inner surface
322*b*: second outer surface
323: third magnet block
323*a*: third inner surface
323*b*: third outer surface
330: second magnet part
331: first magnet unit
331*a*: first inner surface
331*b*: first outer surface
332: second magnet unit
332*a*: second inner surface
332*b*: second outer surface
1000: direct current relay according to a related art
1100: fixed contact according to a related art
1200: movable contact according to a related art
1300: permanent magnet according to a related art
1310: first permanent magnet according to a related art
1320: second permanent magnet according to a related art
C: central portion of space part 115, 215, 315
A.P: arc path

What is claimed is:

1. An arc path forming part, comprising:

a magnet frame comprising a space part for accommodating an arc chamber and a plurality of surfaces surrounding the space part;

a first magnet part accommodated in the space part and comprising a magnet part disposed on at least one of the plurality of surfaces of the magnet frame, wherein the magnet part is positioned adjacent to one surface of the plurality of surfaces; and a second magnet part positioned adjacent to the other one surface of the plurality of surfaces facing the first magnet part with the space part interposed therebetween, wherein the first magnet part comprises a plurality of magnet blocks disposed side by side in a direction in which the one surface extends, each inner surface thereof facing each other being magnetized to the same polarity, and wherein an inner surface of the second magnet part facing the first magnet part is magnetized to a polarity different from said polarity.

2. The arc path forming part of claim 1, wherein the first magnet part comprises:

a first magnet block that extends in a direction in which the one surface of the magnet frame extends, and is positioned to be biased to one side in the extending direction; and a second magnet block that extends in the same direction as the direction in which the first magnet block extends, and is positioned to be biased to the other side of the extending direction.

3. The arc path forming part of claim 2, wherein the first magnet block and the second magnet block are disposed spaced apart from each other.

4. The arc path forming part of claim 2, wherein the second magnet part extends in a direction in which the other one surface of the magnet frame extends.

5. The arc path forming part of claim 1, wherein a magnetic intensity of the second magnet part is greater than a magnetic intensity of any one of the plurality of magnet blocks of the first magnet part.

6. The arc path forming part of claim 5, wherein the second magnet part is an Nd magnet (Neodymium Magnet) or an NIB magnet (Neodymium-Iron-Boron Magnet).

7. The arc path forming part of claim 1, wherein a fixed contact and a movable contact accommodated in the arc chamber are positioned between the first magnet part and the second magnet part.

8. An arc path forming part, comprising:

a magnet frame comprising a space part for accommodating a fixed contact;

a first magnet part comprising a magnet part accommodated in the space part, the magnet part being biased to one side of the space part; and a second magnet part positioned biased to the other side of the space part to face the first magnet part with the space part interposed therebetween, wherein the first magnet part comprises at least a pair of magnet blocks, each having an inner surface facing each other and magnetized to the same polarity, and at least one magnet block having an inner surface facing the second magnet part and magnetized to the same polarity as said polarity, the magnet blocks of the first magnet part being disposed side by side toward another other side and yet another other side opposite thereto, and wherein an outer surface of the second magnet part opposite to the space part is magnetized to the same polarity as said polarity.

9. The arc path forming part of claim 8, wherein the first magnet part comprises:

a first magnet block positioned biased to one of the another other side and the yet another other side and extending along the disposition direction;

a second magnet block positioned biased to the other one of the another other side and the yet another other side and extending along the disposition direction; and a third magnet block positioned between the first magnet block and the second magnet block and extending along the disposition direction.

10. The arc path forming part of claim 9, wherein an inner surface of the first magnet block facing the third magnet block and an inner surface of the second magnet block facing the third magnet block are magnetized to the same polarity, and among surfaces of the third magnet block, an inner surface facing the second magnet part is magnetized to the same polarity as each of the inner surfaces of the first magnet block and the second magnet block.

11. The arc path forming part of claim 9, wherein the third magnet block is in contact with the first magnet block and the second magnet block, respectively, so that the first magnet part is formed in a Halbach array.

12. The arc path forming part of claim 8, wherein a magnetic intensity of the second magnet part is greater than a magnetic intensity of any one of the plurality of magnet blocks of the first magnet part.

13. The arc path forming part of claim 12, wherein the second magnet part is an Nd magnet (Neodymium Magnet) or an NIB magnet (Neodymium-Iron-Boron Magnet).

14. An arc path forming part, comprising:

a magnet frame comprising a space part for accommodating a fixed contact;

a first magnet part comprising a magnet part accommodated in the space part, the magnet part being biased to one side of the space part; and a second magnet part positioned biased to the other side of the space part to face the first magnet part with the space part interposed therebetween, wherein the first magnet part comprises at least a pair of magnet blocks, each having an inner surface facing each other and magnetized to the same polarity, and at least one magnet block having an inner surface facing the second magnet part and magnetized to the same polarity as said polarity, the magnet blocks of the first magnet part being disposed side by side toward another other side and yet another other side opposite thereto, and wherein the second magnet part comprises:

a first magnet unit positioned biased to one of the another other side and the yet another other side and extending along the disposition direction; and a second magnet unit posited biased to the other one of the another other side and the yet another other side and extending along the disposition direction.

15. The arc path forming part of claim 14, wherein an inner surface of surfaces of the first magnet unit facing the space part and an inner surface of surfaces of the second magnet unit facing the space part are magnetized to the same polarity.

16. The arc path forming part of claim 15, wherein each of the inner surfaces of the plurality of magnet blocks of the first magnet part is magnetized to a polarity different from that of each of the inner surfaces of the first magnet unit and the second magnet unit of the second magnet part.

17. A direct current relay, comprising:

a fixed contact electrically connected to an external power source and load;

a movable contact coming into contact with and spaced apart from the fixed contact;

an arc chamber for accommodating the fixed contact and the movable contact; and an arc path forming part that surrounds the arc chamber and directs an arc generated inside the arc chamber, wherein the movable contact has a length in one direction longer than a length in the other direction, wherein the arc path forming part comprises: a first magnet part disposed spaced apart from the movable contact along the one direction on one side of the movable contact; and a second magnet part disposed on the other side of the movable contact and spaced apart from the movable contact along the one direction to face the first magnet part with the movable contact interposed therebetween, wherein the first magnet part comprises a plurality of magnet blocks disposed side by side along the other direction and having inner surfaces facing each other magnetized to the same polarity, and wherein an inner surface of the second magnet part facing the first magnet part is magnetized to a polarity different from said polarity.

18. A direct current relay, comprising:

a fixed contact electrically connected to an external power source and load;

a movable contact coming into contact with and spaced apart from the fixed contact; and an arc path forming part in which a space part for accommodating the fixed contact and the movable contact is formed therein, wherein the arc path forming part comprises:

a pair of surfaces partially surrounding the space part and disposed to face each other;

a first magnet part disposed adjacent to one of the pair of surfaces in the space part; and a second magnet part disposed adjacent to the other one of the pair of surfaces in the space part, wherein the first magnet part comprises at least a pair of magnet blocks, each having an inner surface facing each other and magnetized to the same polarity, and at least one magnet block having an inner surface facing the second magnet part and magnetized to the same polarity as said polarity, the magnet blocks of the first magnet part being disposed side by side toward another other side and yet another other side opposite thereto, and wherein an inner surface of the second magnet part facing the first magnet part is magnetized to a polarity different from said polarity.

19. A direct current relay, comprising:

a fixed contact electrically connected to an external power source and load;

a movable contact coming into contact with and spaced apart from the fixed contact; and an arc path forming part in which a space part for accommodating the fixed contact and the movable contact is formed therein, wherein the arc path forming part comprises:

a pair of surfaces surrounding a portion of the space part and disposed to face each other;

another pair of surfaces surrounding the remaining portion of the space part, being continuous with the pair of surfaces, and disposed to face each other;

a first magnet part disposed adjacent to one of the pair of surfaces in the space part; and a second magnet part disposed adjacent to the other one of the pair of surfaces in the space part, wherein the first magnet part comprises at least a pair of magnet blocks, each having an inner surface facing each other and magnetized to the same polarity, and at least one magnet block having an inner surface facing the second magnet part and magnetized to the same polarity as said polarity, the magnet blocks of the first magnet part being disposed side by side toward another other side and yet another other side opposite thereto, and wherein the second magnet part comprises a plurality of magnet units disposed side by side along a direction in which the other surface extends, each inner surface facing each other being magnetized to a polarity different from said polarity.

* * * * *